US006629182B1

(12) United States Patent
Mizoguchi et al.

(10) Patent No.: US 6,629,182 B1
(45) Date of Patent: Sep. 30, 2003

(54) ELECTRONIC DEVICE AND DOCKING SYSTEM AND POWER CONTROL SYSTEM THEREFOR

(75) Inventors: Shigeru Mizoguchi, Kawasaki (JP); Kenji Maeda, Yokohama (JP); Jun Oida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/122,325

(22) Filed: Jul. 24, 1998

(30) Foreign Application Priority Data

Jul. 25, 1997 (JP) .............................. 9-213947
Jul. 29, 1997 (JP) .............................. 9-217000
Jul. 31, 1997 (JP) .............................. 9-219042
Jan. 22, 1998 (JP) ............................. 10-024034

(51) Int. Cl.$^7$ ................................................ G06F 1/00
(52) U.S. Cl. ...................... 710/303; 710/304; 713/330; 713/324
(58) Field of Search ................... 710/303–304, 710/301–302; 713/320, 323, 324, 330, 340

(56) References Cited

U.S. PATENT DOCUMENTS

| 5,596,728 A | * | 1/1997 | Belmont ..................... 710/301 |
| 5,832,237 A | * | 11/1998 | Lee ............................. 710/301 |
| 5,889,964 A | * | 3/1999 | Cho et al. .................... 710/301 |
| 5,930,110 A | * | 7/1999 | Nishigaki et al. ........... 361/686 |
| 5,930,517 A | * | 7/1999 | Diehl et al. ................. 713/323 |
| 5,999,997 A | * | 12/1999 | Pipes .......................... 710/301 |
| 6,209,105 B1 | * | 3/2001 | Hamamoto .................. 713/300 |

\* cited by examiner

*Primary Examiner*—Paul R. Myers
*Assistant Examiner*—Raymond N Phan
(74) *Attorney, Agent, or Firm*—Fitzpatrick, Cella, Harper & Scinto

(57) ABSTRACT

In an electronic device capable of being driven on a battery, there is provided a docking system configuration in which a docking unit mainly serving as an extension can be attached/detached to/from a master unit by using a system bus as a bridge. The docking unit is adapted to operate alone upon start-up of a power source even while being detached from the master unit. In each of the master unit and the docking unit, detection is made for whether the units are docked each other and for whether a residual capacity of a driving battery in steps is decreased. When it is detected that the residual capacity of the driving battery is decreased, either of operation suspending processing or operation end processing is selectively executed.

8 Claims, 30 Drawing Sheets

SHEET SUPPLY DIRECTION

|     | BJ DOCK | ST DOCK | CORE ALONE |
|-----|---------|---------|------------|
| ID0 | 0       | 1       | 1          |
| ID1 | 1       | 0       | 1          |
| ID2 | 0       | 0       | 1          |

FIG. 6

| CURRENT [mA] | TEMP. | | | | | | | | | |
|---|---|---|---|---|---|---|---|---|---|---|
| | 9C≧ | 10C≦15C≦ | 15C≦20C≦ | 20C≦25C≦ | 25C≦30C≦ | 30C≦35C≦ | 35C≦40C≦ | 40C≦45C≦ | 45C≦50C≦ | 50C≦55C≦ | 55C≦ |
| 134≧ | 12.33 | 12.37 | 12.40 | 12.50 | 12.59 | 12.63 | 12.68 | 12.68 | 12.69 | 12.70 | 12.70 |
| 135≦ | 12.09 | 12.14 | 12.20 | 12.35 | 12.50 | 12.56 | 12.63 | 12.65 | 12.66 | 12.66 | 12.67 |
| 270≦ | 11.79 | 11.86 | 11.93 | 12.13 | 12.32 | 12.42 | 12.53 | 12.56 | 12.58 | 12.59 | 12.61 |
| 540≦ | 11.74 | 11.78 | 11.83 | 12.00 | 12.17 | 12.29 | 12.41 | 12.45 | 12.50 | 12.53 | 12.55 |
| 810≦ | 11.68 | 11.70 | 11.72 | 11.87 | 12.02 | 12.15 | 12.28 | 12.35 | 12.42 | 12.45 | 12.49 |
| 1080≦ | 11.61 | 11.62 | 11.63 | 11.77 | 11.91 | 12.04 | 12.17 | 12.25 | 12.33 | 12.38 | 12.42 |
| 1350≦ | 11.44 | 11.46 | 11.48 | 11.60 | 11.72 | 11.84 | 11.95 | 12.04 | 12.12 | 12.19 | 12.25 |
| 2025≦ | 11.30 | 11.33 | 11.36 | 11.46 | 11.57 | 11.66 | 11.75 | 11.84 | 11.92 | 12.00 | 12.07 |
| 2700≦ | 11.25 | 11.28 | 11.31 | 11.39 | 11.47 | 11.54 | 11.62 | 11.69 | 11.76 | 11.82 | 11.88 |
| 3375≦ | 11.21 | 11.23 | 11.25 | 11.31 | 11.37 | 11.42 | 11.48 | 11.54 | 11.59 | 11.64 | 11.69 |
| 4050≦ | 11.11 | 11.13 | 11.15 | 11.16 | 11.17 | 11.19 | 11.21 | 11.23 | 11.26 | 11.28 | 11.31 |

FIG. 12

| CURRENT [mA] | 9C≤ | 10C≤15C≤ | 15C≤20C≤ | 20C≤25C≤ | 25C≤30C≤ | 30C≤35C≤ | 35C≤40C≤ | 40C≤45C≤ | 45C≤50C≤ | 50C≤55C≤ | 55C≤ |
|---|---|---|---|---|---|---|---|---|---|---|---|
| 134≥ | 13.67 | 13.74 | 13.81 | 14.00 | 14.18 | 14.27 | 14.35 | 14.37 | 14.39 | 14.39 | 14.40 |
| 135≤ | 13.18 | 13.29 | 13.40 | 13.70 | 14.00 | 14.13 | 14.26 | 14.29 | 14.32 | 14.33 | 14.33 |
| 270≤ | 12.59 | 12.72 | 12.86 | 13.25 | 13.65 | 13.85 | 14.05 | 14.11 | 14.17 | 14.19 | 14.21 |
| 540≤ | 12.47 | 12.56 | 12.65 | 13.00 | 13.35 | 13.58 | 13.81 | 13.91 | 14.01 | 14.05 | 14.09 |
| 810≤ | 12.35 | 12.39 | 12.44 | 12.74 | 13.04 | 13.30 | 13.56 | 13.70 | 13.84 | 13.91 | 13.97 |
| 1080≤ | 12.22 | 12.25 | 12.27 | 12.54 | 12.81 | 13.08 | 13.35 | 13.51 | 13.67 | 13.76 | 13.84 |
| 1350≤ | 11.88 | 11.92 | 11.97 | 12.21 | 12.45 | 12.68 | 12.90 | 13.07 | 13.24 | 13.37 | 13.50 |
| 2025≤ | 11.60 | 11.66 | 11.72 | 11.93 | 12.13 | 12.32 | 12.51 | 12.68 | 12.85 | 13.00 | 13.15 |
| 2700≤ | 11.51 | 11.56 | 11.61 | 11.77 | 11.93 | 12.08 | 12.24 | 12.37 | 12.51 | 12.64 | 12.76 |
| 3375≤ | 11.41 | 11.46 | 11.51 | 11.62 | 11.73 | 11.85 | 11.96 | 12.07 | 12.18 | 12.28 | 12.38 |
| 4050≤ | 11.22 | 11.25 | 11.29 | 11.31 | 11.33 | 11.38 | 11.42 | 11.47 | 11.52 | 11.56 | 11.61 |

FIG. 13

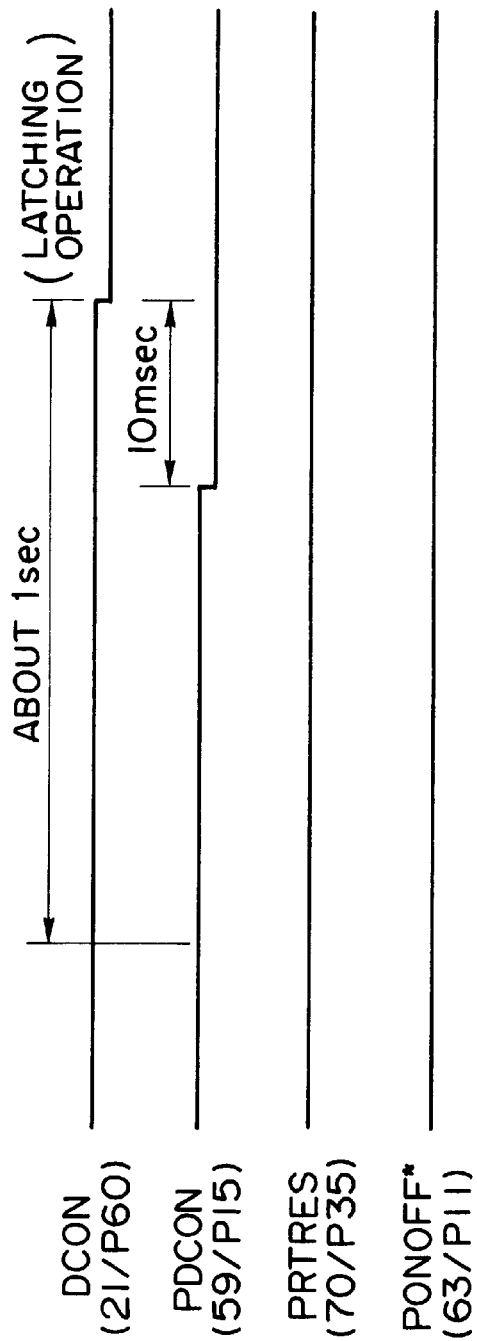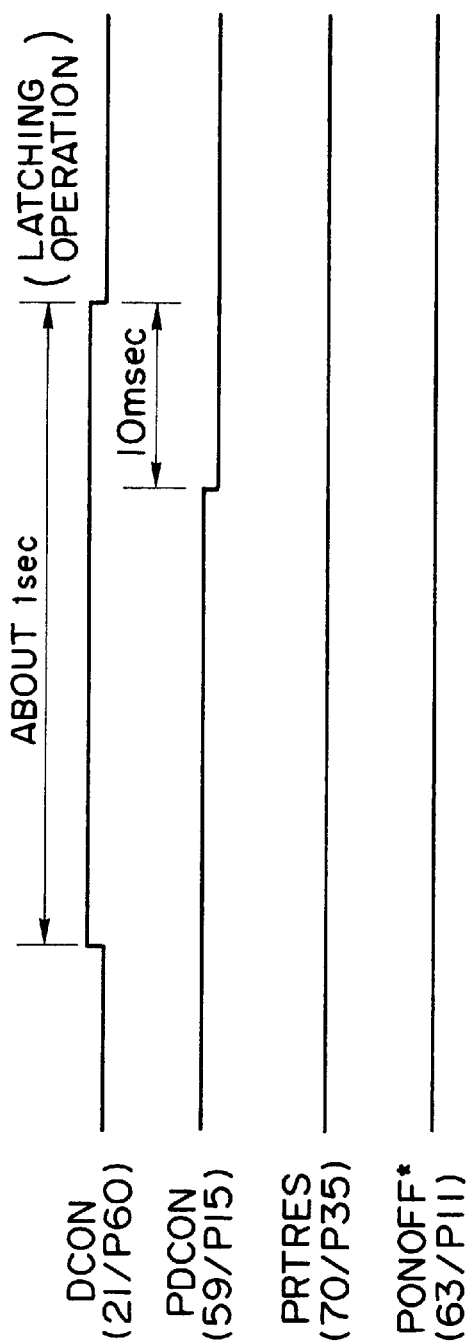

ELECTRONIC DEVICE AND DOCKING SYSTEM AND POWER CONTROL SYSTEM THEREFOR

BACKGROUND OF THE INVENTION

1. Field of the Invention

The present invention relates to an electronic device that can operate on a battery, such as a portable computer composed of a core unit (Core Unit) as the main body of a notebook PC (Personal Computer) and a docking unit (Dock Unit) for an extension, e.g., an ST docking unit (Standard Dock Unit) or a BJ docking unit (BJ Dock Unit), and a power source control method and device for controlling the power source of the electronic device.

2. Related Background Art

In a conventional portable computer (to be referred to as first prior art hereinafter) composed of a core unit (master unit) as the main body of a notebook PC and a BJ docking unit (docking unit) for an extension, low battery control remains the same regardless of whether the core unit operates alone or the core unit and the docking unit are connected (docked) to each other. Furthermore, the docking unit does not operate alone. That is, control for low voltages is performed according to one scheme.

In a conventional portable computer (to be referred to second prior art hereinafter) composed of a core unit (master unit) as the main body of a notebook PC and a docking unit for an extension, only a single docking unit is used, and optimization is achieved by charge/discharge control based on one scheme.

In a conventional portable computer (to be referred to third prior art hereinafter) composed of a core unit (master unit) as the main body of a notebook PC and a docking unit for an extension, the docking unit does not operate alone, and hence there is no need to select a power source to be started up in accordance with information indicating whether the docking unit is docked or not.

In a conventional portable computer (to be referred to fourth prior art hereinafter) composed of a core unit (master unit) as the main body of a notebook PC and a docking unit for an extension, power source control is performed only while the core unit operates alone and the core unit and the docking unit are docked to each other. However, since the docking unit does not operate alone, power source control is performed according to one scheme.

In a secondary battery charge scheme (to be referred to as fifth prior art hereinafter) in a control device that can operate on a secondary battery and has a charge circuit, charging is performed by using an AC adaptor or the like as a supply power source for the charge circuit. If the AC adaptor has sufficient power capacity, charging can be performed with full power while the control device normally operates. In general, however, the AC adaptor is manufactured in accordance with the maximum power of the control device owing to limitations on energy saving, cost, outer dimensions, and the like. For this reason, charging is not performed or performed with small power while the control device operates. When the power source of the control device is turned off, power from the AC adaptor can be fully used. In addition, in a control device in which two secondary batteries can be mounted, the two batteries are controlled independently in the same manner.

In the first prior art, when the BJ docking unit equipped with a $\mu$BJ printer that becomes a large load variation element with respect to the battery-powered electronic device is connected to the core unit to build a system, the operation of the $\mu$BJ printer must be inhibited before the system reaches its actual operation stop level as the battery residual capacity decreases in consideration of a drop in battery voltage due to a large load variation caused by the $\mu$BJ printer. For this reason, the following problem is posed.

No consideration is given to control in a case in which the system does not reach its stop level as the battery residual capacity decreases after the $\mu$BJ printer shifts to the operation inhibition level, and the current state must be canceled upon reception of power from a different power source such as an adaptor, and in a case in which the BJ docking unit is detached from the core unit to operate alone.

In the second prior art, no consideration is given to docking units having different power capacities, and no charge/discharge control is provided for the respective docking units. For this reason, the following problem is posed.

Since the system is optimized by one discharge/charge control scheme, when docking units having different power capacities are used, a discharge/charge control scheme that can be realized for the docking unit having the smaller power capacity is used. As a result, the docking unit having the larger power capacity cannot exhibit its power supply performance exceeding the performance defined in the control scheme.

In the third prior art, no consideration is given to a case in which the docking unit operates alone. That is, power source start-up control is not performed for the BJ docking unit alone. For this reason, the following problem is posed.

When a docking unit, such as the BJ docking unit, is to operate alone for replacement of the print head or the ink tank, a necessary power source cannot be selectively started up.

In the fourth prior art, although practical operations are limited, no power source control is performed for the BJ docking unit alone. For this reason, the following problem is posed.

Assume that the user forgets to turn off the power source while the BJ docking unit is operated alone to replace the print head or the ink tank. Such a situation cannot be properly handled because the main power source control unit is located on the core unit side.

In the fifth prior art, the secondary battery must be charged after the power source of the controller is turned off. If the power source is kept on, many hours are required to complete charging. For this reason, the following problem is posed.

As the controller is designed to be portable and driven on a secondary battery, its use is considerably limited.

SUMMARY OF THE INVENTION

The present invention has been made in consideration of the above problems in the prior art, and has as its first object to provide an electronic device which can perform processing control for a drop in battery voltage in accordance with the docking/non-docking state of a docking unit and a master unit.

It is the second object of the present invention to provide an electronic device obtained by docking a master unit and a docking unit to each other, which can perform optimal charge/discharge control for a secondary battery to be used.

It is the third object of the present invention to provide an electronic device which can perform control to selectively start up one of a plurality of electric circuits upon detection of the docking/non-docking state of a master unit and a docking unit.

It is the fourth object of the present invention to provide an electronic device which allows a power source control unit in a docking unit connected to a master unit to perform independent control upon detection of independent operation of the docking unit, e.g., turning off a power source upon detecting that a "CAPACK" state, in which no print command is issued to a printer, has continued for 15 min or more.

It is the fifth object of the present invention to provide a power source control method and device which can shorten the time required to charge a secondary battery with a simple circuit arrangement.

In order to achieve the first object, according to the present invention, there is provided an electronic device which can be driven on a battery and has a docking system configuration in which a docking unit mainly serving as an extension can be attached/detached to/from a master unit by using a system bus as a bridge, the docking unit operating alone upon start-up of a power source even while being detached from the master unit, and each of the docking unit and the master unit including docking detection means for detecting whether the units are docked to each other, residual capacity decrease detection means for detecting a decrease in residual capacity of a driving battery in steps, and execution means for selecting and executing operation suspending processing or operation end processing for the current system configuration when the residual capacity decrease detection means detects a decrease in residual capacity of the driving battery.

In order to achieve the second object, according to the present invention, there is provided an electronic device which can be driven on a battery and has a docking system configuration in which an extension portion can be detachably mounted by using a system bus as a bridge, the system comprising a plurality of extension portions, wherein a power source control IC of each of a master portion and the extension portions connected in the docking system includes setting means for selecting and setting a low battery detection threshold and a charge current limit which are unique to the current system.

In order to achieve the third object, according to the present invention, there is provided an electronic device having a docking system configuration in which a docking unit mainly serving as an extension can be attached/detached to/from a master unit by using a system bus as a bridge, the docking unit being capable of operating alone upon start-up of a power source even while being detached from the master unit, and the docking unit including docking detection means for detecting whether the docking unit is docked to the master unit, and control means for, when it is determined on the basis of the detection result obtained by the docking detection means that the docking unit operates as a docking system together with the master unit, performing power source control and initialization through the master unit, and for, when the docking unit operates while being detached from the master unit, controlling all power sources through a power source control unit in the docking unit.

In order to achieve the fourth object, according to the present invention, there is provided an electronic device which can be driven on a battery and has a docking system configuration in which a docking unit mainly serving as an extension can be attached/detached to/from a master unit by using a system bus as a bridge, the docking unit incorporating a printer and being capable of operating alone upon start-up of a power source even while being detached from the master unit, and each of the docking unit and the master unit comprising docking detection means for detecting whether the units are docked to each other, operation state detection means for detecting an operation state of the printer, and control means for, when the docking unit operates as a docking system together with the master unit, performing operation by power source control through the master unit, and for, when the docking unit operates while being detached from the master unit, controlling all power sources through a power control unit in the docking unit, and performing control to turn off the power source if no operation/print command is received after a lapse of a predetermined period of time.

In order to achieve the fifth object, according to the present invention, there is provided a power source control method comprising the detection step of detecting a current consumption of an electronic device that can be driven on a secondary battery, and the charge current control step of limiting a charge current in accordance with the current consumption detected in the detection step.

In addition, in order to achieve the fifth object, according to the present invention, there is provided a power source control method comprising the charge step of charging each of a plurality of secondary batteries of an electronic device that can be driven on the plurality of secondary batteries, and the charge control step of controlling charging of each second battery in the charge step.

BRIEF DESCRIPTION OF THE DRAWINGS

FIG. 6 is a table of extension units and connection state discrimination IDs in the electronic device according to the embodiment of the present invention;

FIG. 12 is a view showing an "Auto suspend to Disk" OFF mode detection table in the electronic device according to the embodiment of the present invention;

FIG. 13 is a view showing an "Auto suspend to Disk" ON mode detection table in the electronic device according to the embodiment of the present invention;

FIG. 25 is a timing chart showing the timing of turning off the power source when the system is in a docking state in the electronic device according to the embodiment of the present invention;

FIG. 26 is a timing chart showing the timing of turning off the power source when the BJ docking unit operates alone in the electronic device according to the embodiment of the present invention;

DETAILED DESCRIPTION OF THE PREFERRED EMBODIMENTS

Preferred embodiments of the present invention will be described with reference to the accompanying drawings.

Figure 1:
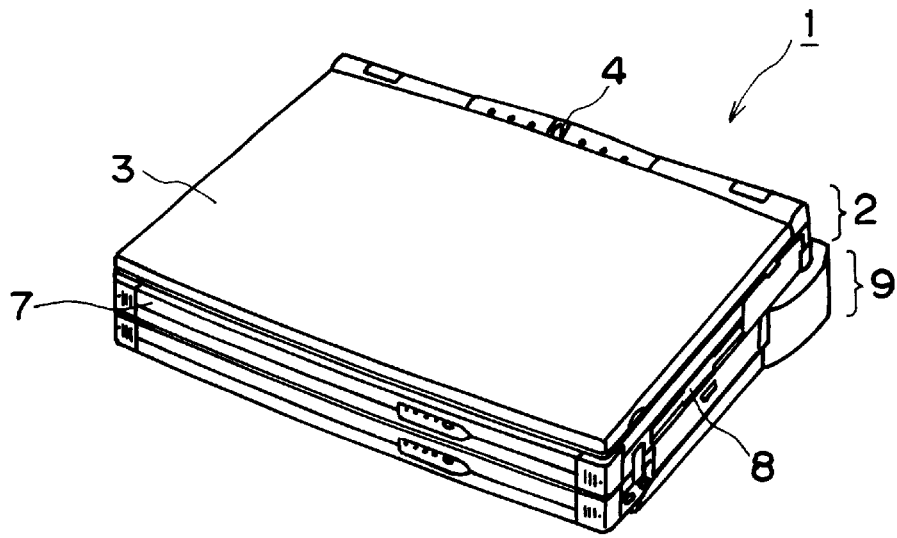
FIG. 1 is a perspective view showing an electronic device when it is carried or not used according to an embodiment of the present invention.
Figure 2:
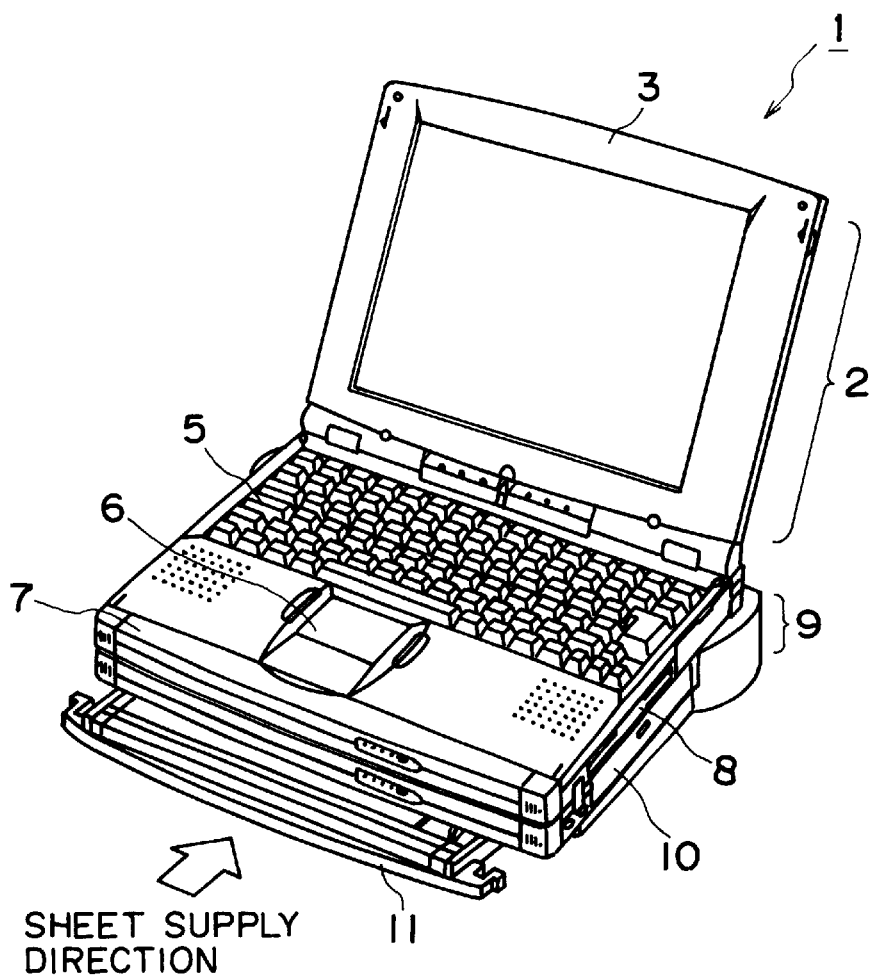
FIG. 2 is a perspective view showing the electronic device when it is used according to the embodiment of the present invention.

FIG. 1 is a perspective view showing a portable computer, i.e., a notebook PC (Personal Computer), as an electronic device according to an embodiment of the present invention when it is carried or not used. FIG. 2 is a perspective view showing the notebook PC when it is used. Referring to FIGS. 1 and 2, a notebook PC 1 has a core unit (Core Unit) 2 as a master unit that is the main body of the notebook PC 1. The core unit 2 is composed of a display 3 such as a liquid crystal display, a power source switch 4, a keyboard 5 as an input device, a pointing device 6, a battery pack 7 detachably mounted in the core unit 2, a floppy disk drive 8, a hard disk drive (not shown), and the like.

A BJ docking unit (BJ Dock Unit) 9 for an extension is made up of a CD-ROM (Compact Disk Read-Only Memory) drive 10, a sheet supply guide 11 for supplying a sheet to a compact bubble jet ($\mu$BJ) printer (to be referred to as a printer hereinafter), and the like. The BJ docking unit 9 incorporates a printer and extension functions for communication, a sound source, and the like.

The core unit 2 and the BJ docking unit 9 can be attached/detached to/from each other through a connector (not shown). When the units 2 and 9 are used upon being docked (connected), a docking lever (not shown) is used to inhibit the units from easily separating from each other during operation. The system of the notebook PC 1 is started up through the start-up sequence in the flow chart of FIG. 14 (to be described later) upon detection of the docking/non-docking state of the two units 2 and 9 by a sensor.

Figure 3:
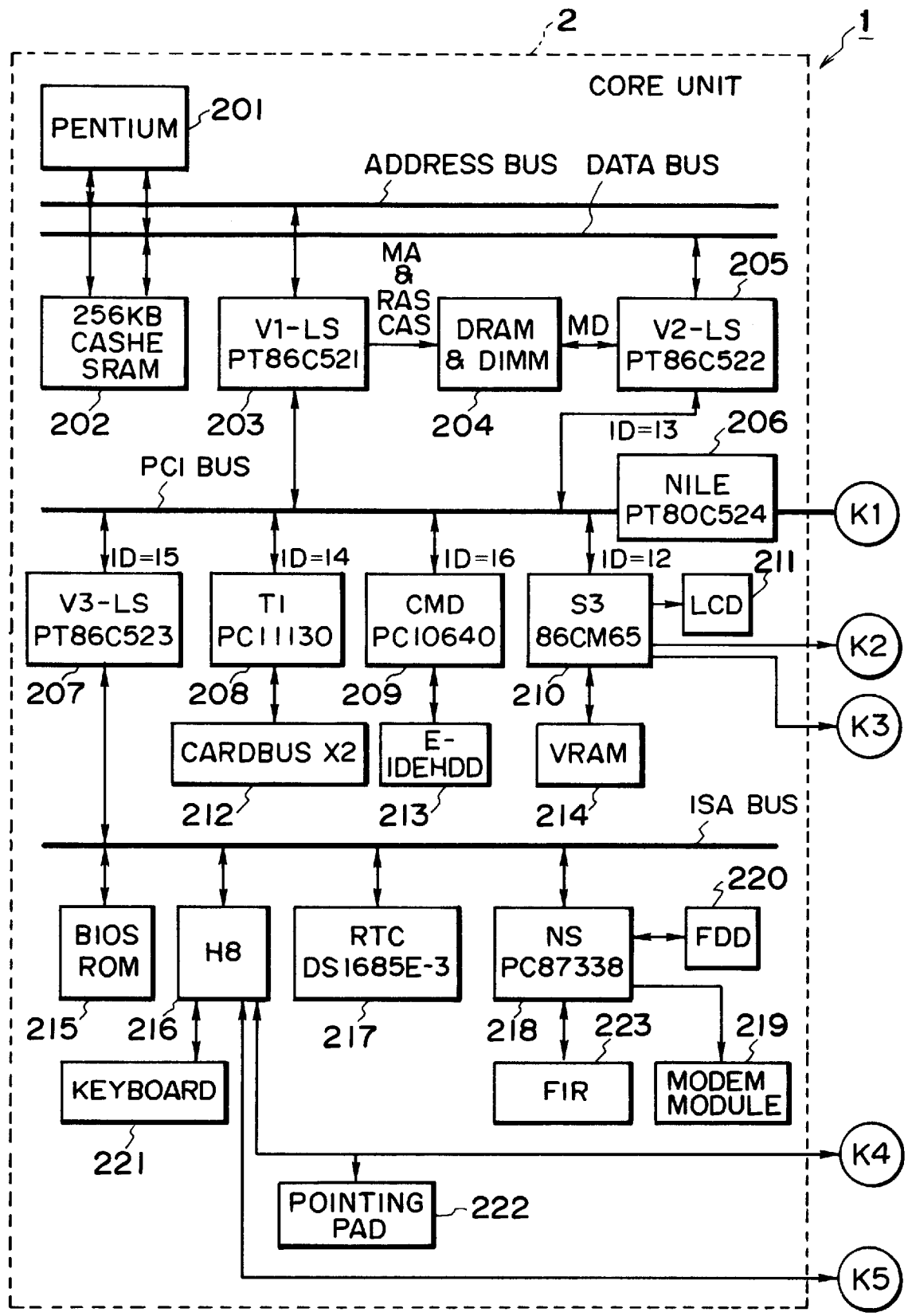
FIG. 3 is a block diagram showing the system configuration of the electronic device according to the embodiment of the present invention.
Figure 4:
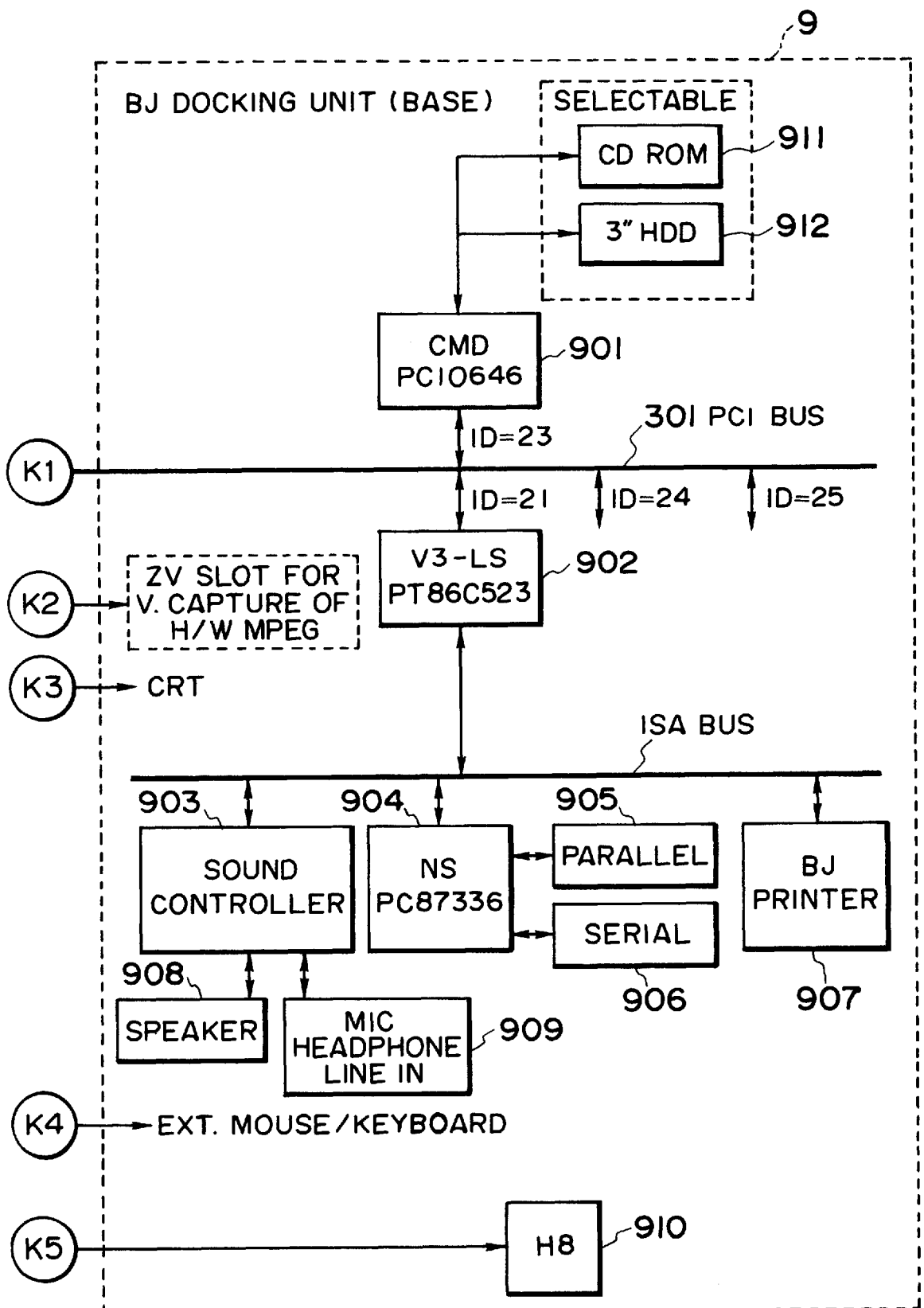
FIG. 4 is a block diagram showing the system configuration of the electronic device according to the embodiment of the present invention.

FIGS. 3 and 4 are block diagrams respectively showing the arrangements of the core unit 2 and the BJ docking unit 9 in the notebook PC 1 having the above arrangement.

As shown in FIG. 3, the core unit 2 includes a PENTIUM® 201, a 256 KB Cache SRAM 202, a V1-LS PT86C521 203, a DRAM & DIMM 204, a V2-LS PT86C522 205, a NILE PT80C524 206, a V3-LS PT86C523 207, a TI-PCI1130 208, a CMD PCI0643 209, an S3 86CM65 210, an LCD 211, a CardbusX2 212, an E-IDE HDD 213, a VRAM 214, a BIOS ROM 215, an H8 216, an RTC 1685E-3 217, an NS PC87338 218, a Modem Module 219, an FDD 220, a Keyboard 221, a Pointing Pad 222, and an FIR 223.

As shown in FIG. 4, the BJ docking unit 9 includes a CMD PCI0646 901, a V3-LS PT86C523 902, a Sound Controller 903, an NS PC87336 904, a Parallel 905, a Serial 906, a BJ Printer 907, a Speaker 908, an Mic Headphone Line In 909, and an H8 910. A CD-ROM 911 and a 3" HDD 912 are switchably connected to the CMD PCI0646 901.

The two units 2 and 9 are connected to each other through a PCI Bus 301. An IC (integrated circuit) for controlling connection to the BJ docking unit 9 is arranged on the core unit 2 side. The H8 216 and the H8 910 of the two units 2 and 9 are controllers for mainly performing power source switching control, charge/discharge control, residual capacity detection control, and the like, and control the power source by exchanging signals two-ways.

The H8 216 in the BJ docking unit 9 performs control on the μBJ printer (BJ Printer) 907 in addition to the above control.

Figure 5:
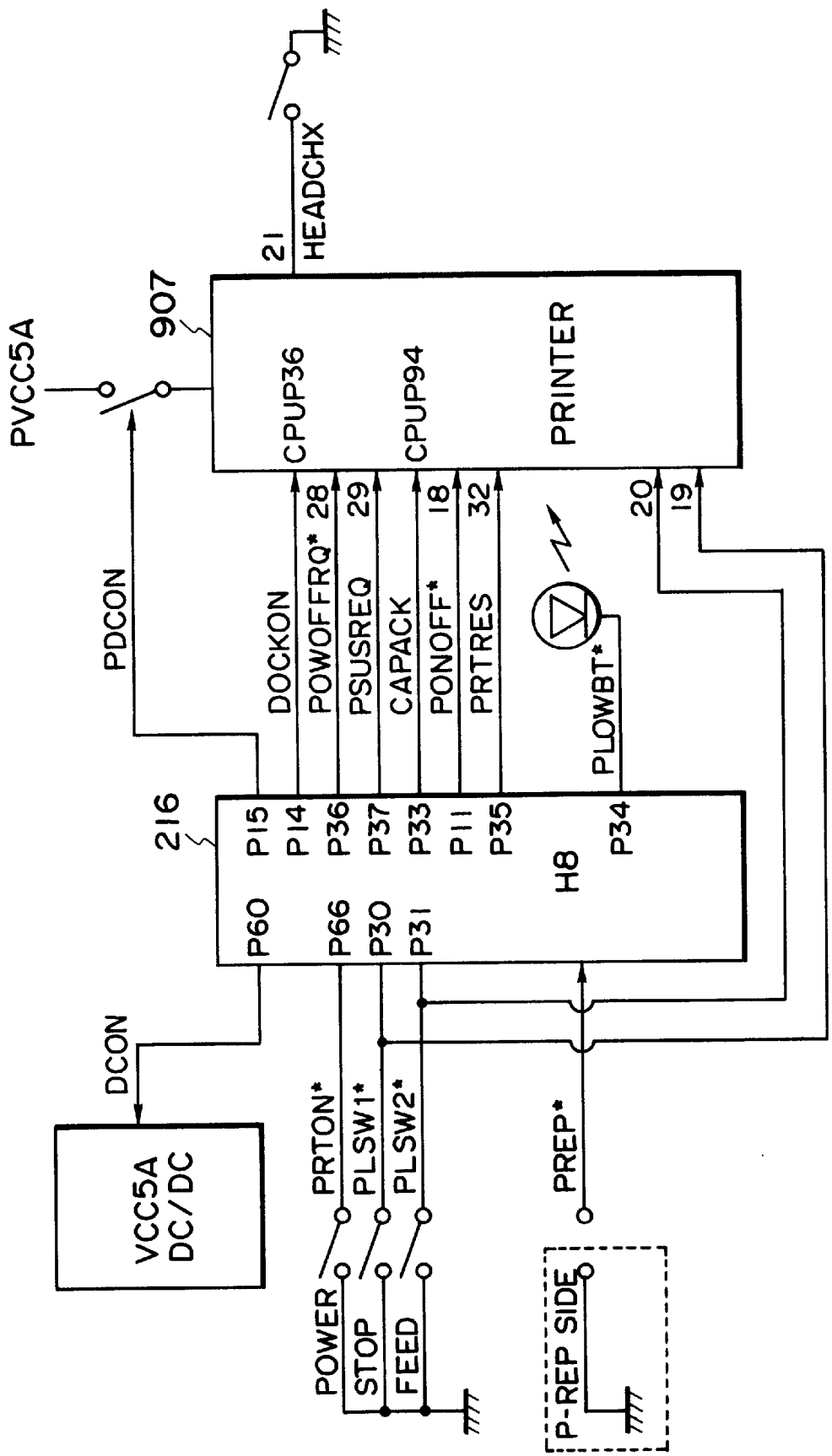
FIG. 5 is a view showing control signals between the H8 of the BJ docking unit and the printer logic and power source circuits associated with these signals in the electronic device according to the embodiment of the present invention.

FIG. 5 shows control signals between the H8 216 and the printer logic in the BJ docking unit 9 and power source circuits associated with these signals.

Referring to FIG. 5, the PDCON signal output from P15 of the H8 216 is a 5-V (PVCC5A) start-up signal (positive logic) for the printer logic. The DCON signals output from P60 of the H8 216 are 5-V (VCC5A) and 3.3-V (VCC3A) start-up signals (positive logic) for the peripheral logic other than the BJ Printer 907 in the BJ docking unit 9 in FIG. 4. The BJ docking unit 9 includes a plurality of power source circuits (not shown) for the ANPWEN signal for analog 6V (VCC6AD), the H8ON signal for the logic power source (VCC5H8) for the H8 216, the H812REQ signal for 12 V (VCC12A), and the like. The H8 216 manages these circuits.

The DOCKON signal (positive logic) is output as a connection state discrimination signal with respect to the core unit 2 from P14 of the H8 216 to the BJ Printer 907. The H8 216 outputs the following signals as printer control signals:

POWOFFRQ* (negative logic) from P36: a command signal for stopping printer operation and shifting to the stop enable state;

PONOFF* (negative logic) form P11: a signal for printer ON/OFF operation (the contents of the register in the printer are not initialized); and PRTRES (positive logic) from P35: a RESET signal to the printer logic.

As an ACK signal for the POWOFFRQ* signal, the CAPACK signal (positive logic) is output from the BJ Printer 907 to the H8 216.

The core unit 2 and the BJ docking unit 9 are connected to each other through a 100-pin connector. The above signal lines, the power source/GND lines, the ID, and the like are connected to these pins.

The BJ docking unit 9 can operate alone without connection to the core unit 2 so as to replace the print head and ink tank of the BJ Printer 907 mounted in the unit 9. The BJ docking unit 9 has a power switch for independent operation and a print head replacement switch (neither of which are shown) on a surface to be connected to the core unit 2.

This operation is an exceptional operation state for replacement of the print head and ink tank of the BJ Printer 907. Upon detection of this state, therefore, the H8 216 in the BJ docking unit 9 starts up only the power source associated with the required function.

As another docking unit that can be connected to the core unit 2, an ST docking unit (Standard Dock Unit) is used, which is equivalent to the BJ docking unit 9 from which the BJ Printer 907 is omitted, and hence is compact in size, exhibiting high portability.

Since the ST docking unit has no μBJ printer, there is no need to replace the print head and the ink tank. This unit does not therefore operate alone, and serves as a slave with respect to the core unit 2.

An adaptor (output rating: 20 V/2.0 A) to be attached to the ST docking unit is smaller in supply power and size than an adaptor (output rating: 20 V/2.7 A) to be attached to the BJ docking unit 9.

FIG. 6 is a table of the extension units (BJ docking unit and the ST docking unit) and 3-bit connection state discrimination IDs.

The BIOS of the core unit 2 detects this ID upon start-up. If the ID is "1, 1, 1", the BIOS determines that no extension unit is connected. If the ID is "0, 0, 1", the BIOS determines that the ST docking unit is connected. If the ID is "0, 1, 0", the BJ docking unit 9 that the BJ docking unit is connected.

When the core unit 2 is connected to an extension unit, the docking lever is locked so as not to come off. Thereafter, the power source corresponding to the docking unit is started up, and the corresponding PCI bus bridge is coupled and initialized.

The BIOS of the core unit 2 performs setup for the BJ Printer 907 of the BJ docking unit 9, thus performing initialization unique to the BJ Printer 907, i.e., initialization for IRQ to be used, the address of the parallel port, and the like.

When the core unit 2 is to operate alone, the BIOS closes the bridge to the extension PCI bus and performs initialization.

Figure 7:
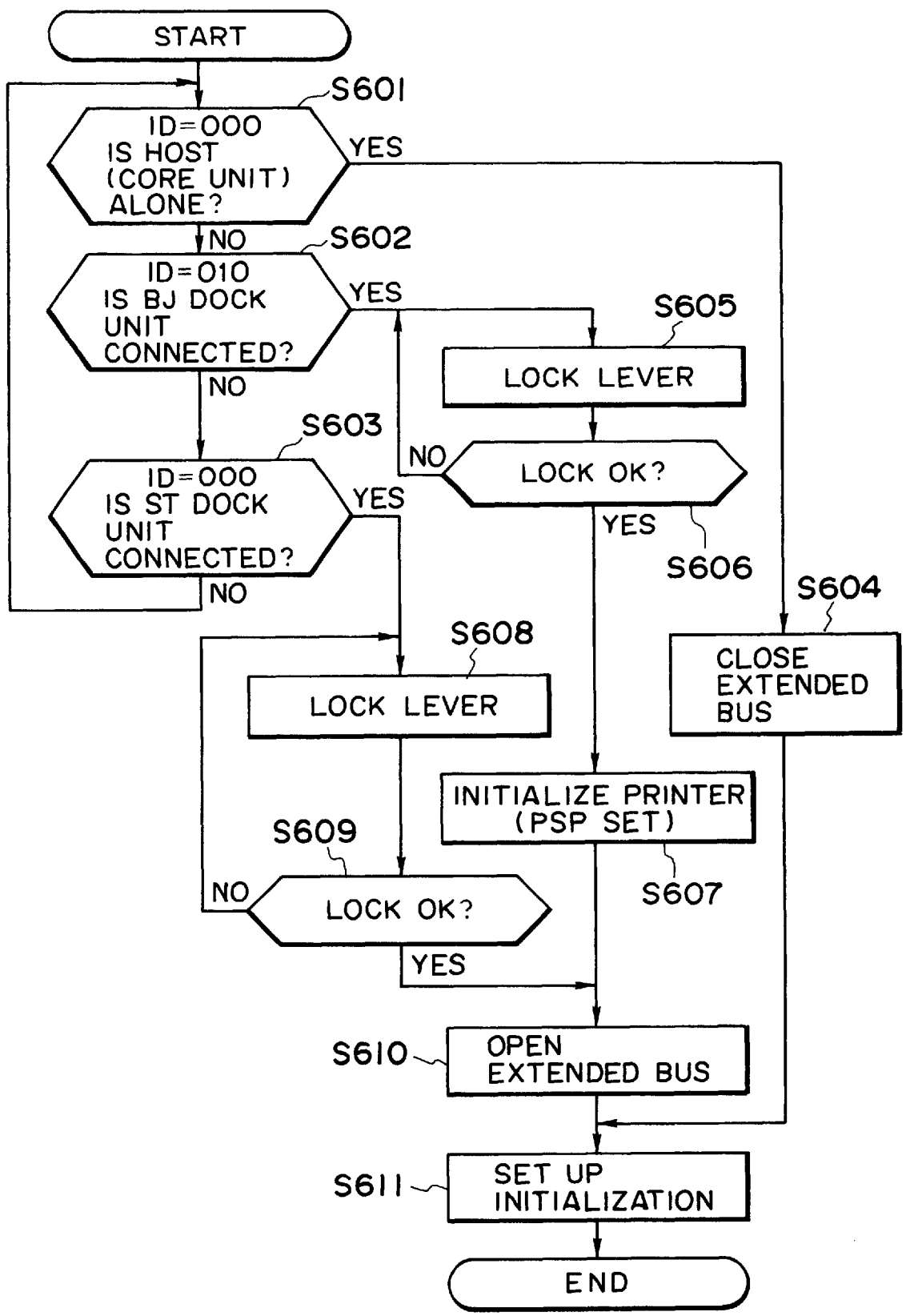
FIG. 7 is a flow chart showing an initialization sequence based on discrimination of an extension unit using a connection state discrimination ID from the host side in the electronic device according to the embodiment of the present invention.

This operation, i.e., closing the bridge to the extension PCI bus and performing initialization, will be described with reference to the flow chart of FIG. 7.

In step S601, the BIOS checks whether the core unit 2 is alone. If YES in step S601, the flow advances to step S604 to close the extension bus. The flow then advances to step S611 to perform initialization. After that, this sequence is terminated.

If NO in step S601, the flow advances to step S602 to check whether the BJ docking unit is connected as an extension unit. If YES in step S602, the flow advances to step S605 to lock the docking lever. The flow then advances to step S606 to check whether the docking lever is properly locked. If NO in step S606, the flow returns to step S605 to lock the docking lever. If YES in step S606, the flow advances to step S607 to initialize the BJ Printer 907. The BIOS then opens the extension bus in step S610, and performs initialization in step S611. Then, this sequence is terminated.

If it is determined in step S602 that the BJ docking unit 9 is not connected, the flow advances to step S603 to check whether the ST docking unit is connected as an extension unit. If YES in step S603, the flow advances to step S608 to lock the docking lever. The flow then advances to step S609 to check whether the docking lever is properly locked. If NO in step S609, the flow returns to step S608 to lock the docking lever again. If YES in step S609, the flow advances to step S610 to open the extension bus. In step S611, initialization is performed. After the initialization, this sequence is terminated.

If it is determined in step S603 that the ST docking unit is not connected, the flow returns to step S601 to check whether the core unit 2 is alone.

Figure 8:
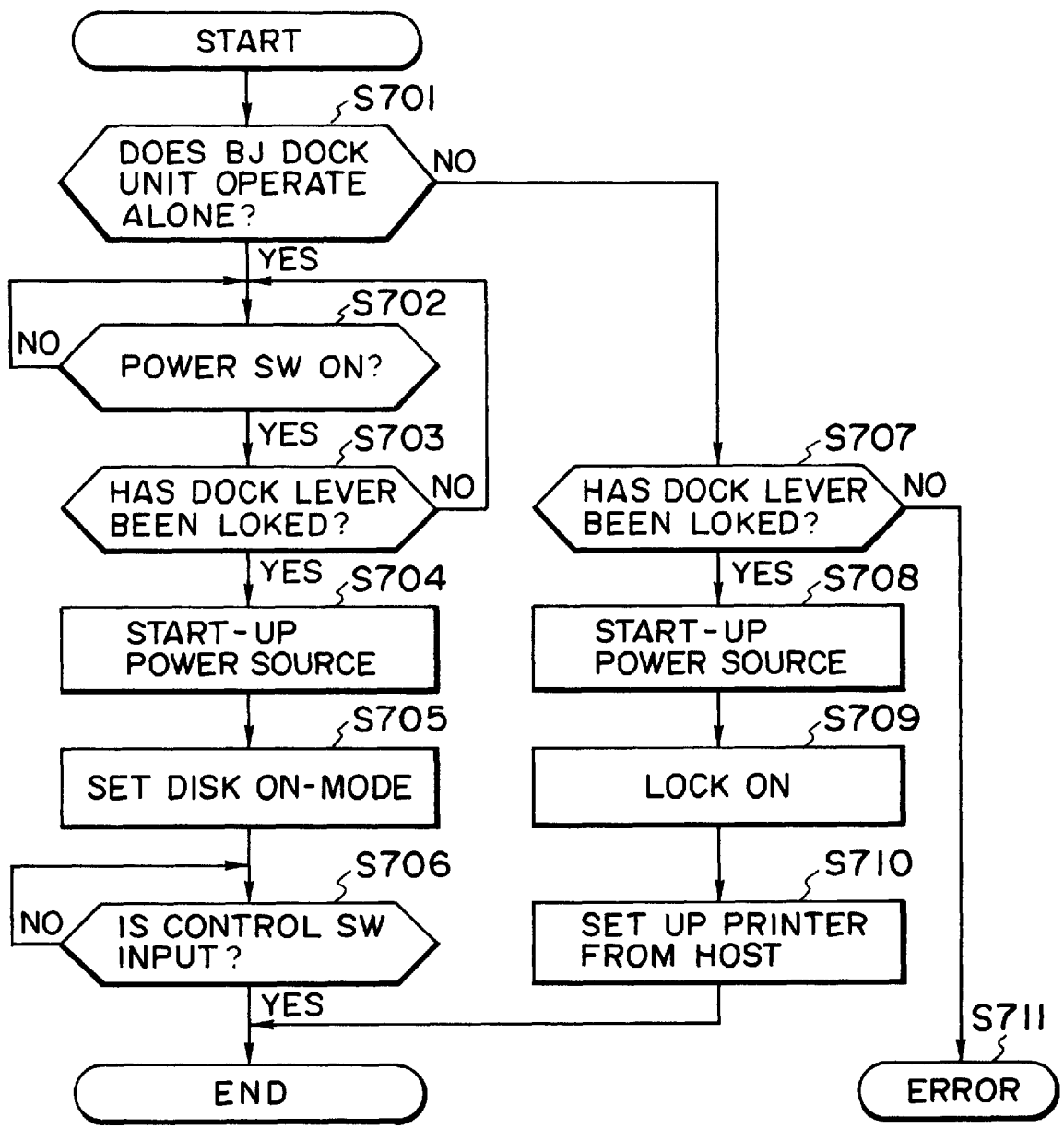
FIG. 8 is a flow chart showing an initialization sequence based on start-up of the power source of the BJ docking unit in the electronic device according to the embodiment of the present invention.

Determination processing to be performed when the power source is started up by the H8 910 of the BJ docking unit 9 will be described next with reference to the flow chart of FIG. 8.

The BJ docking unit 9 demands an exceptional operation as an independent unit to replace the ink tank and print head of the BJ Printer 907 mounted in the unit or to remove a paper sheet when a paper jam occurs. In this case, although the BJ docking unit 9 receives no setup service from the BIOS of the core unit 2, no problem is posed because this operation is a limited function. Since connection to the core unit 2 is not supported when the independent power source of the BJ docking unit 9 is started up, the docking lever is locked upon start-up of the power source to physically prevent docking, even though the BJ docking unit 9 is to operate alone.

First of all, in step S701, it is checked whether the BJ docking unit 9 operates alone. If YES in step S701, it is checked in step S702, until the power switch (Power SW) is turned on, whether the power switch is on (ON). If YES in step S702, it is checked in step S703 whether the docking lever (Dock lever) is locked (IN).

If NO in step S703, the flow returns to step S702. If YES in step S703, the flow advances to step S704. In step S704, the power source is started up. In step S705, the disk on-mode is set. In step S706, it is checked, until a control switch is input, whether the control switch is input. If YES in step S706, this sequence is terminated.

If it is determined in step S701 that the BJ docking unit 9 is not alone, the flow advances to step S707 to check whether the docking lever is locked (IN). If NO in step S707, error (ERROR) processing is performed in step S711. If YES in step S707, the power source is started up in step S708. In step S709, "Lock ON" is performed. In step S710, the BJ Printer 907 is set up. Then, this sequence is terminated.

Figure 9:
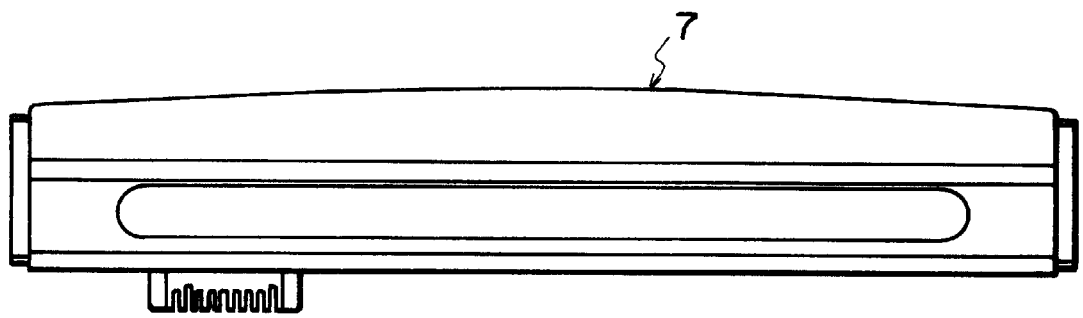
FIG. 9 is a plan view of a battery pack in the electronic device according to the embodiment of the present invention.
Figure 10:
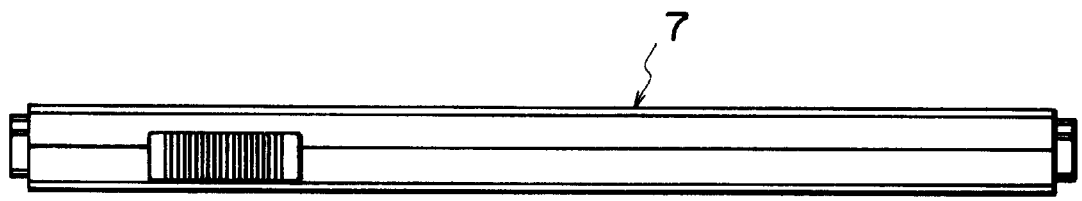
FIG. 10 is a side view of the battery pack in the electronic device according to the embodiment of the present invention.
Figure 11:
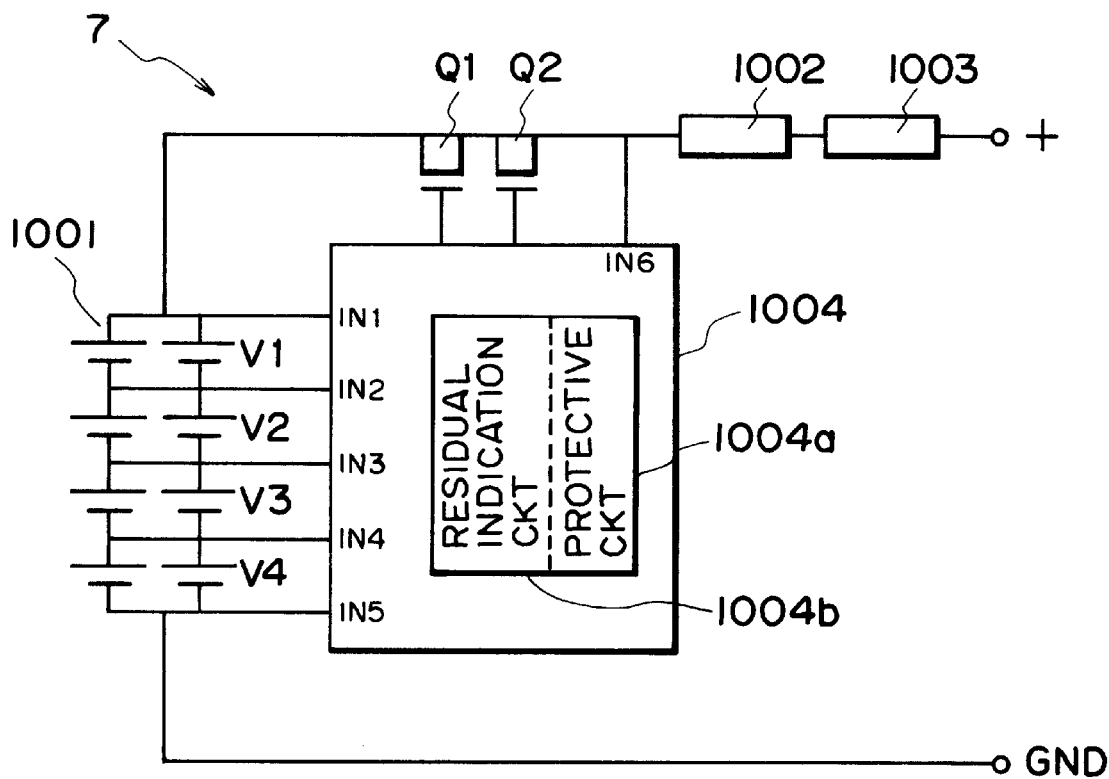
FIG. 11 is a view showing the internal arrangement of the battery pack in the electronic device according to the embodiment of the present invention.

As a battery pack (CD-25LI) in the electronic device according to this embodiment, a lithium ion secondary battery group is used. FIGS. 9 and 10 show the outer appearance of this battery pack. FIG. 11 shows the internal arrangement of the battery pack.

Referring to FIGS. 9 to 11, the battery pack 7 has a battery cell (in use) 1001. As shown in FIG. 11, the battery cell (in use) 1001 has an arrangement in which a combination of four series-connected cells is connected in parallel with an identical combination, and is rated at 14.4 V (one cell=3.6 V) and 2700 mA/H.

The battery pack 7 includes a temperature fuse 1002 and a poly-switch 1003 as protective elements, and a control unit 1004 having a protective circuit 1004a and a residual indication circuit 1004b.

A battery pack 7 having this arrangement can be mounted in each of the core unit 2 and the BJ docking unit 9 (the BJ docking unit 9 has one slot to allow either the battery pack 7 or the speaker unit (Speaker 908 in FIG. 4) to be inserted).

The H8 910 performs power source control based on the following order of power supply to the system. When the battery pack 7a and the adaptor are connected to the system, the power supply path from the adaptor is selected. When the two battery packs 7 are connected to the system while no adaptor is connected, supply of power from the BJ docking unit 9 is selected.

The battery packs 7 are charged in the following order. When the two battery packs 7 are mounted in the system, the battery pack 7 connected to the core unit 2 is selected and used first. Even if the two battery packs 7 are mounted in the system, only one of them is selected and used in operation. Assume that the system is to operate on only the two battery packs 7. In this case, when the H8 910 detects the battery pack 7 mounted in the BJ docking unit 9 has no residual capacity (determines on the basis of a table listing the voltages, currents, and temperature characteristics of the battery packs 7), the power supply path from the BJ docking unit 9 is closed, and the power supply path from the core unit 2 is connected to a power supply line, thereby continuously supplying power.

The SCU of the BIOS selects and sets a low battery threshold for the battery pack 7 controlled by the H8 910. There are three types of thresholds: the "Auto Suspend to Disk" ON voltage, the "Auto Suspend to Disk" OFF voltage, and the "Printer Off Request (POWOFFRQ*)" voltage obtained by adding a voltage to the "Auto Suspend to Disk" ON table when the BJ docking unit 9 is used.

(1) In the "Auto Suspend to Disk" ON-mode, when the battery pack 7 reaches the set threshold, the state of the system during operation is saved in the hard disk (the 3" HDD 912 in FIG. 3), and the power source is turned off. In this mode, when the power source is started up again, the system is restored to the saved state.

(2) In the "Auto Suspend to Disk" OFF-mode, when the battery pack 7 reaches the set threshold, the power source is turned off without saving the text and/or environment even during operation.

(3) In the "Printer Off Request (POWOFFRQ*)" mode, the POWOFFRQ* signal is kept output to inhibit only printer operation, and this state is held until the battery pack 7 reaches a selected one of the thresholds in the above two modes.

Identical tables of low battery thresholds are respectively held in the ROMs in the H8 216 and the H8 910 of the core unit 2 and the BJ docking unit 9.

In this embodiment, in (2) the "Auto Suspend to Disk" OFF-mode, the threshold table shown in FIG. 12 is used.

Referring to FIG. 12, the column direction indicates the current value detected when an A/D converter reads the amplified potential difference across the two ends of a low resistor (20 mΩ) inserted in series in the battery output line, whereas the row direction indicates the temperature detected with a thermister in the battery pack 7. The threshold is determined on the basis of the voltage value in the current/temperature matrix. For example, the threshold voltage obtained with a current (1350≦I<2025 mA) and a temperature (20≦T25° C.) is 11.60 V. When the output voltage from the battery pack 7 drops to this voltage, the H8 216 and the H8 910 shifts the system to the "Auto Suspend to Disk" OFF-mode.

FIG. 13 shows the threshold table used in the (1) "Auto Suspend to Disk" ON-mode.

The threshold voltage obtained with the same current (1350≦I<2025 mA) and the same temperature (20≦T25° C.) is 12.21 V. This value is higher than that obtained from the table in FIG. 12 by 0.61 V. This indicates the power required to save the environment and/or text in the "Disk ".

(3) In the "Printer Off Request (POWOFFRQ*)" mode, the threshold obtained by adding a special voltage to a voltage in the "Auto Suspend to Disk" ON-mode table in FIG. 13 in accordance with the following temperature condition is set.

This low battery threshold is set only when the BJ docking unit 9 is connected to the core unit 2 to construct the system, and determination processing is performed by ID (identification) detection upon start-up of the system.

Figure 14:
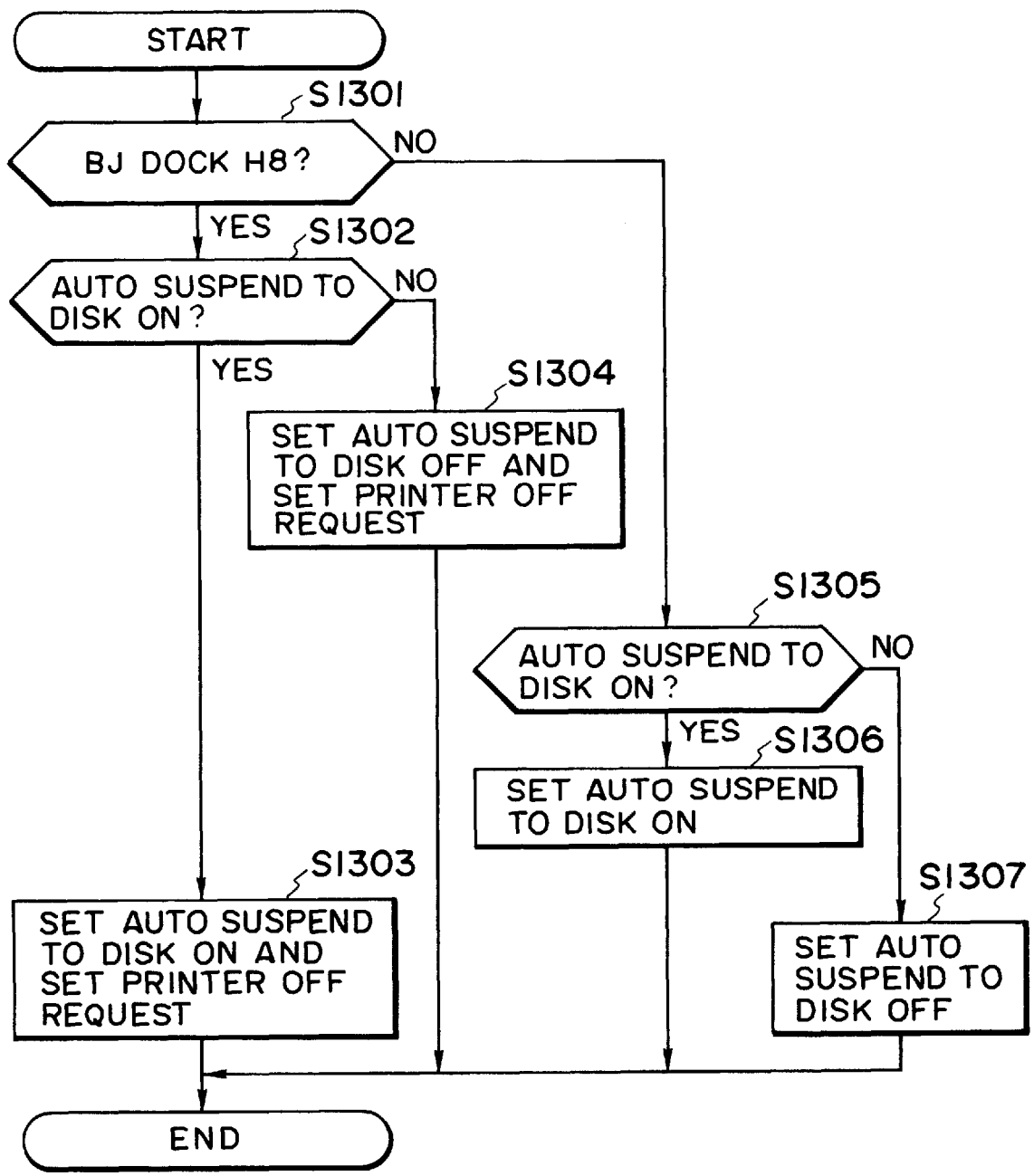
FIG. 14 is a flow chart showing a sequence of selection of a low battery threshold in the electronic device according to the embodiment of the present invention.

This determination processing by ID detection upon start-up of the system will be described with reference to the flow chart of FIG. 14.

First of all, it is checked in step S1301 whether the H8 910 of the BJ docking unit 9 is set. If YES in step S1301, it is checked in step S1302 whether "Auto Suspend to Disk" is on. If YES in step S1302, the "Auto Suspend to Disk" ON-mode and the "Printer Off Request" mode are set, and this sequence is terminated.

If it is determined in step S1302 that "Auto Suspend to Disk" is not on, the "Auto Suspend to Disk" OFF-mode and the "Printer Off Request" mode are set in step S1304. After that, this sequence is terminated.

If it is determined in step S1301 that the H8 910 of the BJ docking unit 9 is not set, it is checked in step S1305 whether "Auto Suspend to Disk" is on. If YES in step S1305, the "Auto Suspend to Disk" ON-mode is set in step S1306. This processing is then terminated. If NO in step S1305, the "Auto Suspend to Disk" OFF-mode is set in step S1307. This processing is then terminated.

| battery temperature > 5° C. | "Auto Save to Disk" voltage is +0.2 V or less |
|---|---|
| 5° C. ≧ battery temperature > 0° C. | "Auto Save to Disk" voltage is +0.4 V or less |
| 0° C. ≧ battery temperature | "Auto Save to Disk" voltage is +4.5 V or less |

Obviously, all the three types of data described above may be held in the form of a table, or two tables may be calculated with respect to one table by using mathematical expressions.

Charge control on the battery pack 7 is performed by the H8 216 in FIG. 3 and the H8 910 in FIG. 4. As shown in FIGS. 9 to 11, a lithium ion secondary battery group is used as the battery pack 7. For this reason, to improve charge precision, the charge voltage is set to 16.37±0.14 V, which is smaller than the set voltage by the set voltage error.

The charge currents of three ranks are set by the H8 216 and the H8 910, and are switched in accordance with a 2-bit signal indicating "ON-mode" or "OFF-mode":

rank (1): 258 mA at maximum;
rank (2): 503 mA at maximum; and
rank (3): 1,818 mA at maximum.

The following three types of charge modes are used:

(1) In the over-discharge trickle charge mode, charging is performed for 60 sec at maximum until the output terminal voltage becomes 12.0 V or more so as to provide protection against over-discharge of the battery pack 7 (to be charged) before OFF/ON-mode charging. If the battery pack 7 is in a proper state, the next charge step is performed. The charge current corresponds to rank (1), i.e., 258 mA at maximum.

(2) In the ON-mode charge mode, charging is performed when the system current is smaller than the set current while the core unit 2 and the BJ docking unit 9 are docked, or the core unit 2 is operating alone and the power supply is turned on. The charge current corresponds to rank (2), i.e., 503 mA at maximum.

(3) In the OFF-mode charge mode, charging is performed while the power source of the main body is off. This charging is performed quickly by using the maximum capacity of the adaptor. The charge current therefore corresponds to rank (3), i.e., 1,818 mA at maximum.

Figure 15:
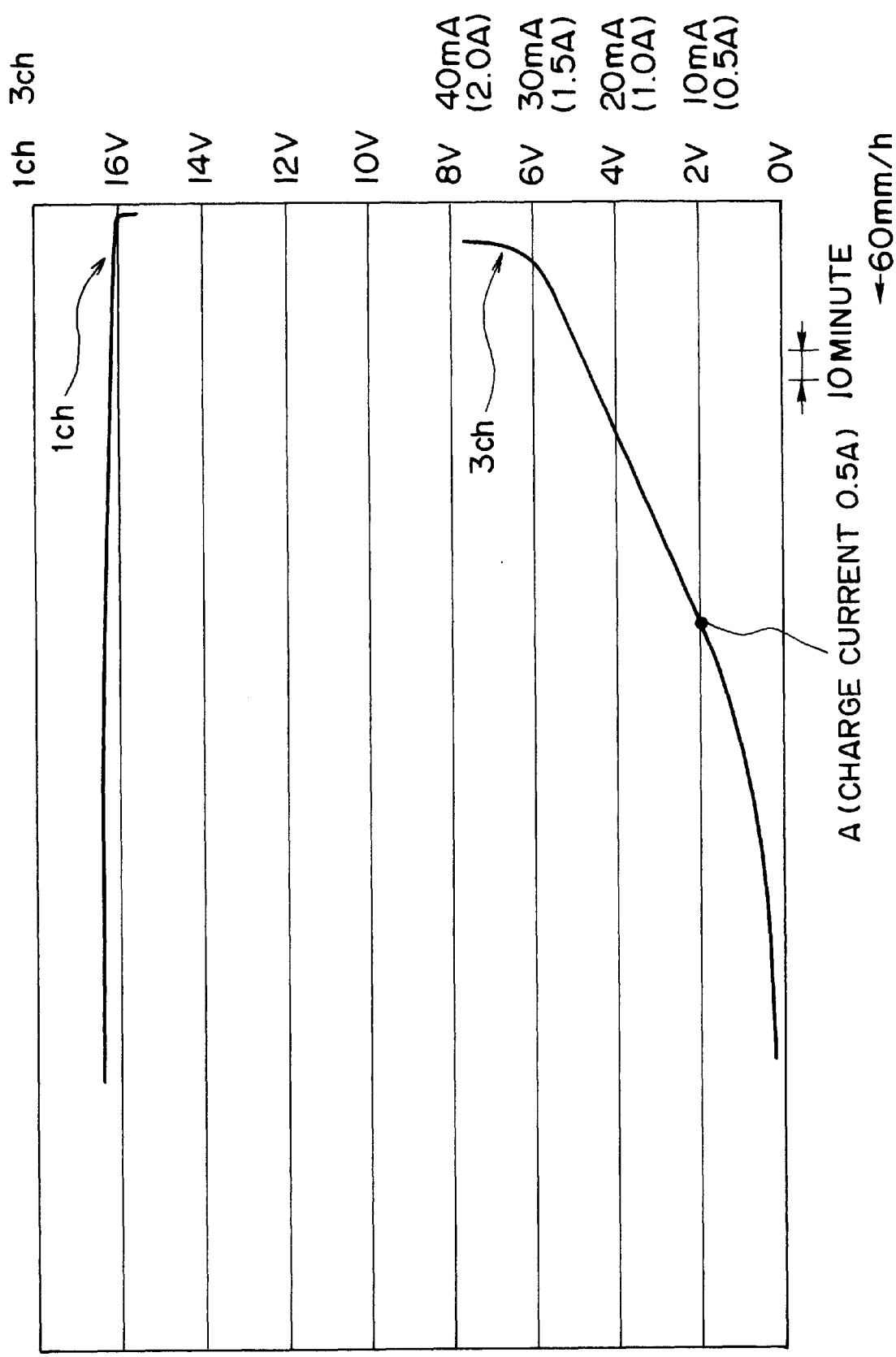
FIG. 15 is a graph showing the data obtained when OFF-mode charging is performed in the electronic device according to the embodiment of the present invention.

FIG. 15 shows the data obtained by performing OFF-mode charging. Referring to FIG. 15, one graduation on the abscissa corresponds to 10 min, and "1ch" and "3ch" on the ordinate respectively indicate the battery pack voltage (0 to 18 V) and the charge current (0 to 4.5 A).

Referring to FIG. 15, at the start of charging, the battery pack voltage is 14.8 V and the charge current is 1.8 A. After a lapse of about 4 hrs and 20 min, the battery pack is fully charged, and the charging operation is completed.

Figure 16:
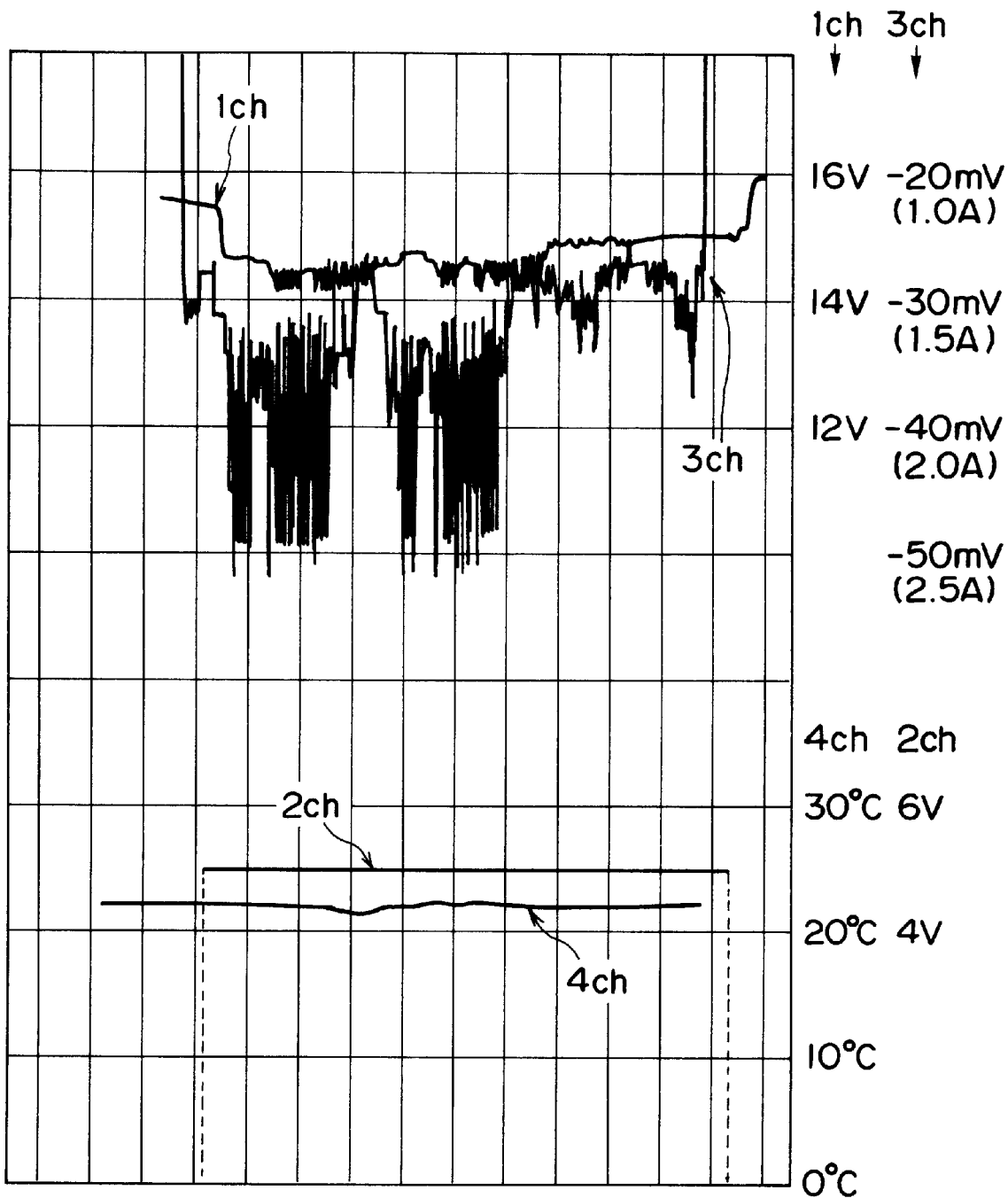
FIG. 16 is a graph showing the data obtained during black solid image printing that is the maximum-load operation of the printer in the electronic device according to the embodiment of the present invention.

FIG. 16 shows a state in which the system obtained by docking the core unit 2 and the BJ docking unit 9 to each other has printed a black solid image requiring the maximum load by using the battery pack 7.

Referring to FIG. 16, "1ch", "3ch", and "4ch" on the abscissa respectively represent the battery pack output voltage (0 to 18 V), the battery pack output current (−5 A to 0 A), and room temperature (0 to 90° C). In addition, the power during black solid image printing in the center of the graph of FIG. 16 is about 35.7 W (=15 V×2.5 A). The terminal voltage of the battery pack 7 quickly dropped by about 0.75 V; the load variation is large.

The output rating of the adaptor of the BJ docking unit 9 is 54 W (=20 V×2.7 A), which differs from the power consumption during maximum-load operation performed by the system obtained by docking the core unit 2 and the BJ docking unit 9 to each other (to be referred to as the BJ Dock system hereinafter) by 6.5 W, and exceeds 9.6 W (=16.37 V×0.5 A) that is required for ON-mode charging. Therefore, ON-mode charging is permitted.

Figure 17:
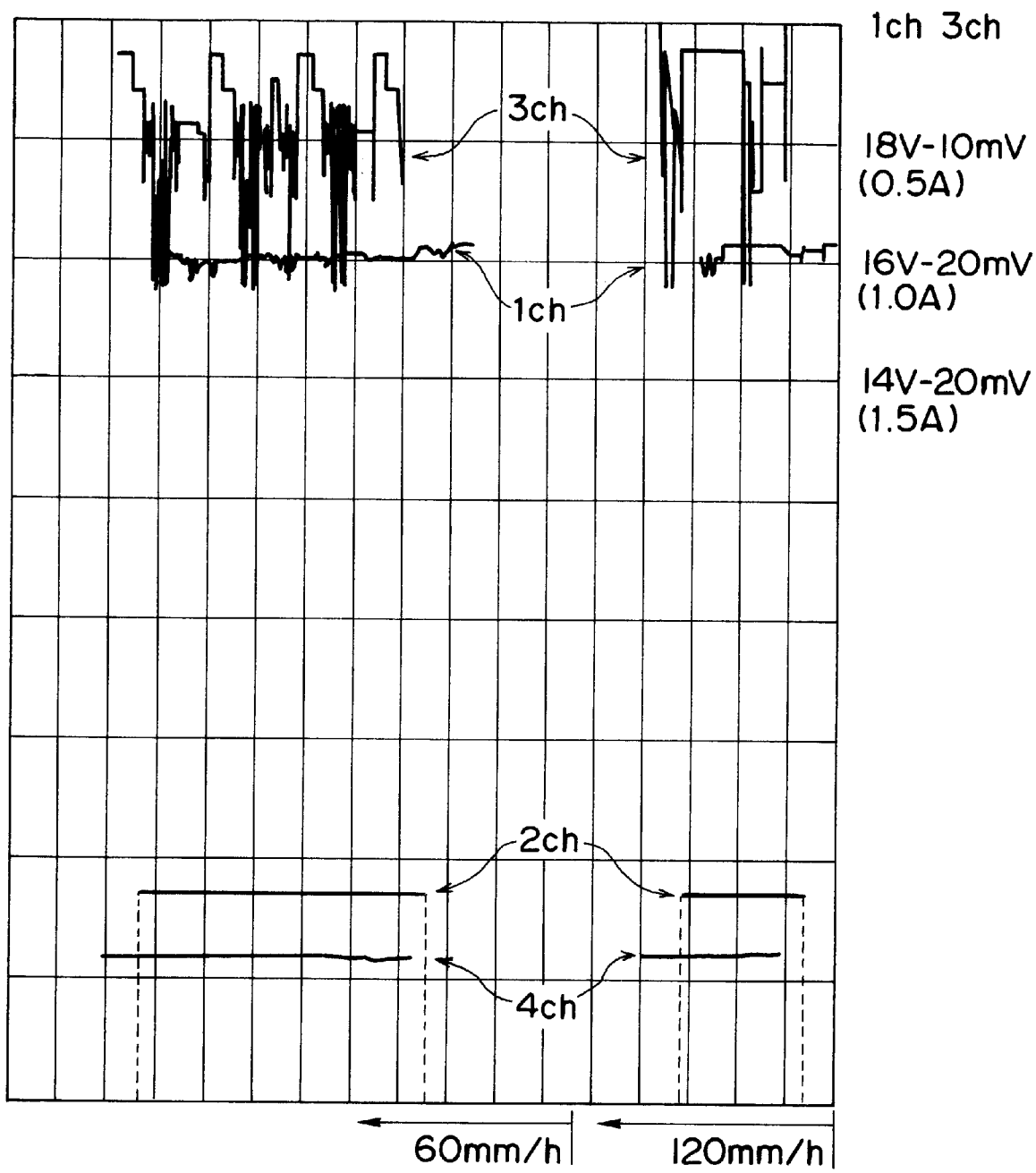
FIG. 17 is a graph showing the data obtained when the BJ docking unit operates alone to replace the print head in the electronic device according to the embodiment of the present invention.

FIG. 17 shows the power consumed when the print head is replaced while the BJ docking unit 9 operates alone. As described above, ON-mode charging should be performed by using the charge current of rank (2). However, when the BJ docking unit 9 operates alone, a power of about 17.6 W (=16 V×1.1 A) is consumed in maximum-load operation. In this case, the maximum power consumption during OFF-mode charging is 35 W (16.37 V×1.8 A/0.85) even in consideration of replacement efficiency, and hence does not exceed the output rating of the adaptor, i.e., 54 W. That is, while the BJ docking unit 9 is operating alone, OFF-mode charging can be performed even if the power source is on.

The BIOS detects the current system state from the ID data shown in FIG. 6, and performs setup operation required for the detected state. This ID data is commonly managed by the H8 216 and the H8 910 for power source control to perform optimal battery control (power source control) in accordance with recognized docking information.

When the power source is turned on, OFF-mode charging is always selected. When the power source is turned on, this mode is selected in accordance with the flow chart of FIG. 18.

Figure 18:
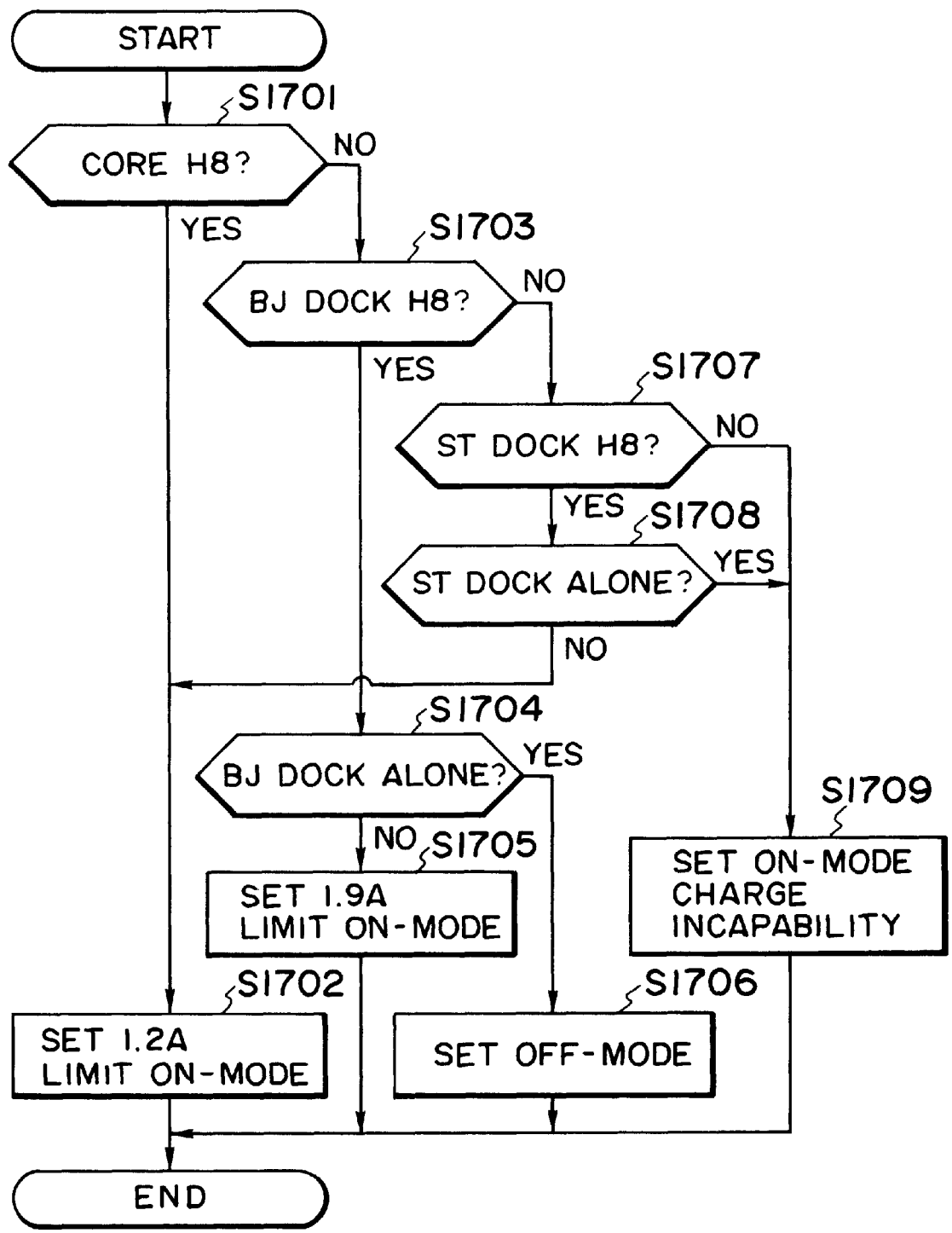
FIG. 18 is a flow chart showing an operation sequence of selection of a charge method in an ON-mode in the electronic device according to the embodiment of the present invention.

Referring to FIG. 18, first of all, it is checked in step S1701 whether the H8 216 of the core unit 2 is set, i.e., the ID is "1, 1, 1". If YES in step S1701, the "1.2 A limit ON-mode" is set. This processing is then terminated.

If NO in step S1701, it is checked in step S1703 whether the H8 910 of the BJ docking unit 9 is set, i.e., the ID is "0, 1, 0". If YES in step S1703, it is checked in step S1704 whether the BJ docking unit 9 is alone. If NO in step S1704, the "1.9 A limit ON-mode" is set in step S1705. This processing is then terminated. If YES in step S1704, the OFF-mode is set in step S1706, and this sequence is terminated.

If it is determined in step S1703 that the H8 910 of the BJ docking unit 9 is not set, it is checked in step S1707 whether the H8 of the ST docking unit is set, i.e., the ID is "0, 0, 1". If YES in step S1707, it is checked in step S1708 whether the ST docking unit is alone. If NO in step S1708, the "1.2 A limit ON-mode" is set in step S1702. This processing is then terminated.

If it is determined in step S1707 that the H8 of the ST docking unit is not set, or it is determined in step S1708 that the ST docking unit is alone, this sequence is terminated after "ON-mode charge incapability" is set in step S1709.

When the BJ docking unit 9 is to operate alone as shown in FIG. 17, since the power consumed by the BJ docking unit 9 is less than the dedicated adaptor power rating, rank (3) charging can be performed. By managing the system state on the basis of ID data in this manner, charge/discharge control can be performed more efficiently.

Figure 19:
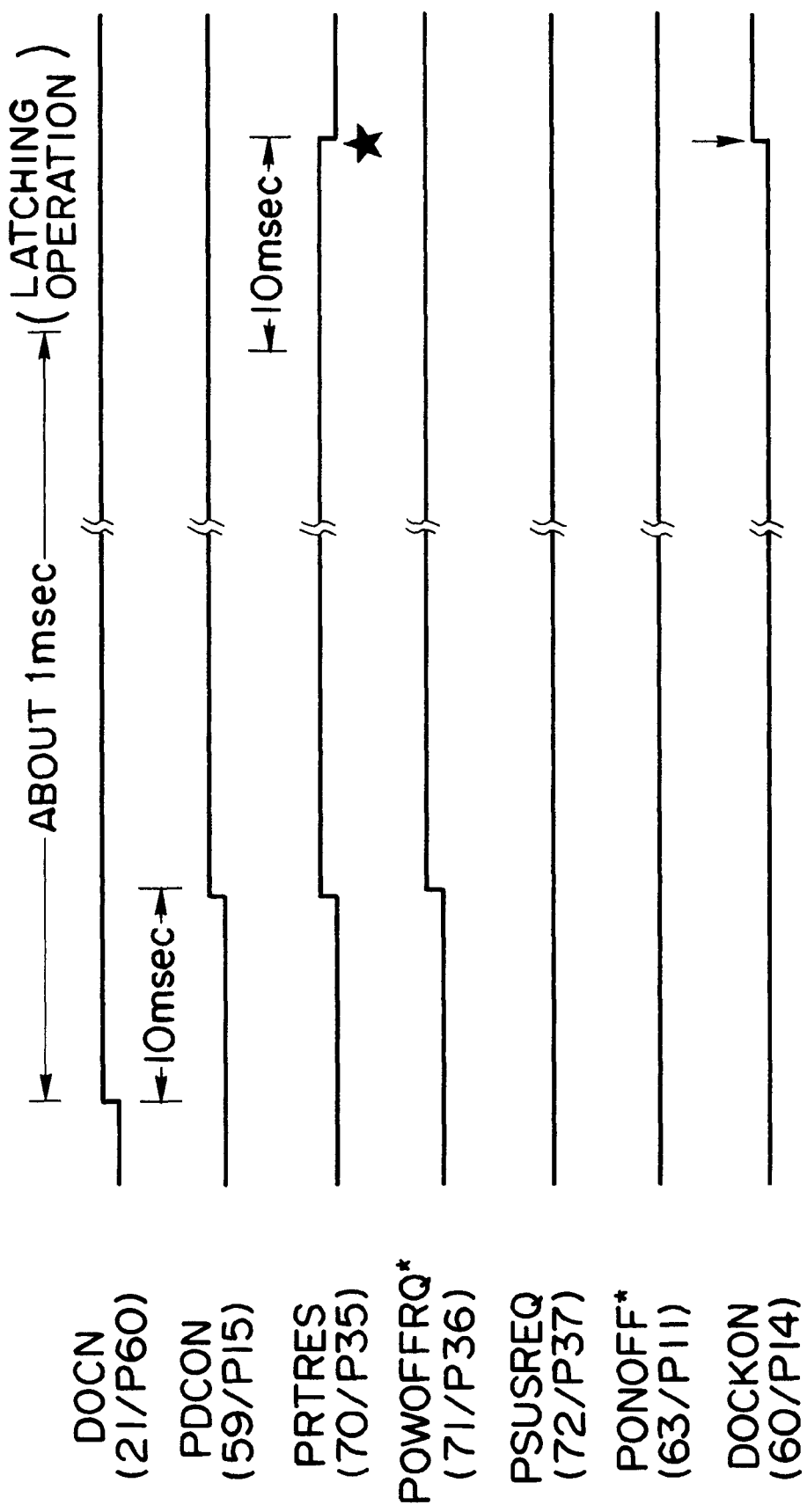
FIG. 19 is a timing chart showing a power source start-up sequence upon formation of a docking system of the core unit and the BJ docking unit in the electronic device according to the embodiment of the present invention.

According to the power supply start-up sequence in the system obtained by docking the core unit 2 and the BJ docking unit 9 to each other, the H8 216 and the H8 910 of the core unit 2 and the BJ docking unit 9 mutually check their states to detect the presence/absence of docking, and the H8 910 of the BJ docking unit 9 issues the DOCKON signal before "PRTRES" removal. At the same time, as shown in FIG. 19, the H8 910 enables "VCC5A" required for latching operation to lock the docking lever in advance, thereby executing the power source start-up sequence for the dock system. In addition, in the core unit 2, after the power source for the dock system is started up, the PCI bus is connected, and the BIOS sets up the constituent elements of the dock system.

Even if it is confirmed that the units are not docked, when the power switch is depressed to operate the BJ docking unit 9 alone, the H8 910 of the BJ docking unit 9 must detect that the BJ docking unit 9 is not docked to the core unit 2 and perform latching operation to lock the docking lever so as to prevent the BJ docking unit 9 from being connected to the core unit 2 during operation.

Figure 20:
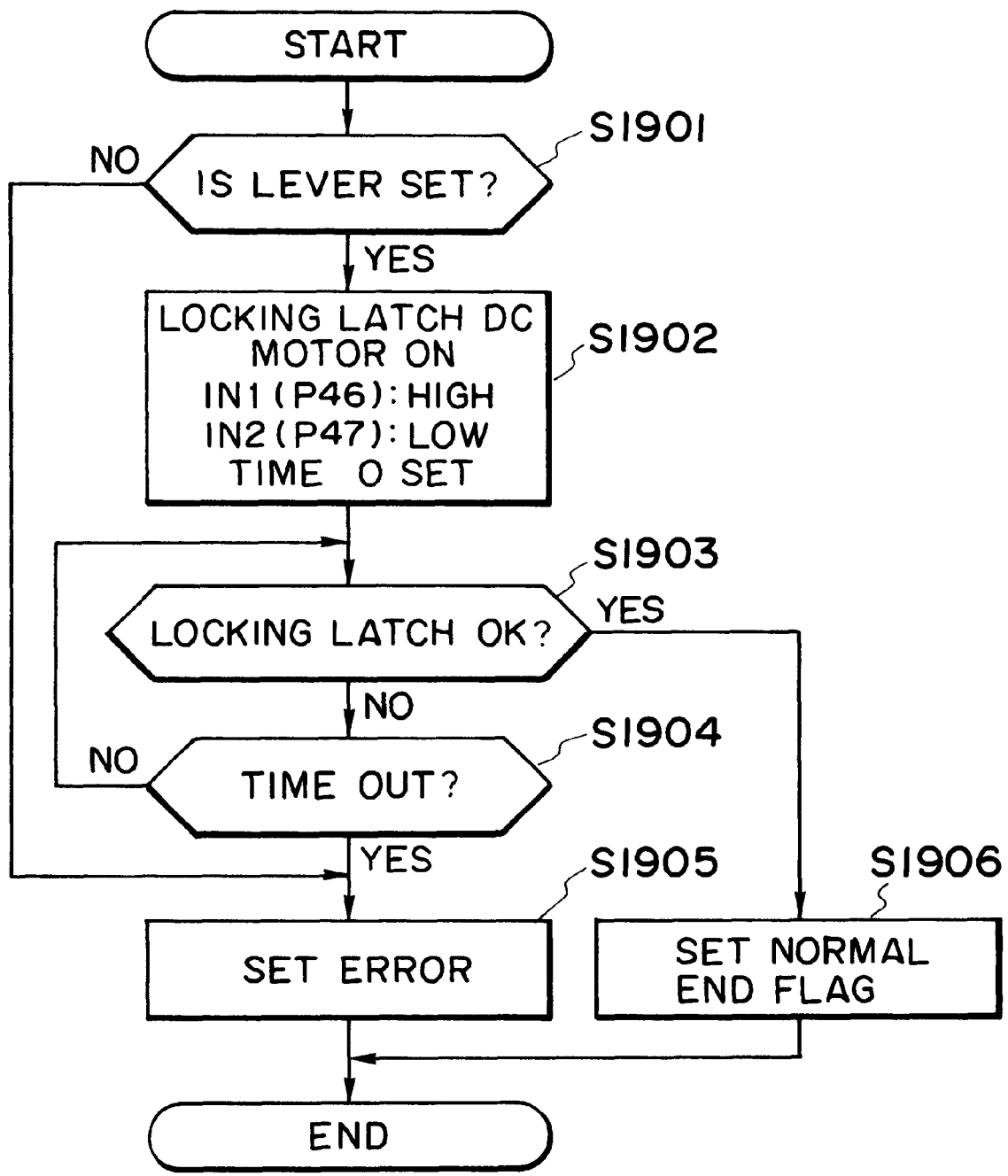
FIG. 20 is a flow chart showing a sequence of latching operation for a docking lever in the electronic device according to the embodiment of the present invention.

The latching operating will be described below with reference to the flow chart of FIG. 20.

In step S1901, it is checked whether the docking lever is set. If YES in step S1901, a DC motor for latching operation is turned on in step S1902. It is checked in step S1903 whether latching operation is properly performed. If NO in step S1903, it is checked in step S1904 whether a time out has occurred. If NO in step S1904, the flow returns to step S1903 to check whether latching operation is properly performed. If YES in step S1904, or NO in step S1901, the flow advances to step S1905 to set "Error". This processing is then terminated.

If it is determined in step S1903 that latching operation is properly performed, a normal end flag is set in step S1906, and this sequence is terminated.

Figure 21:
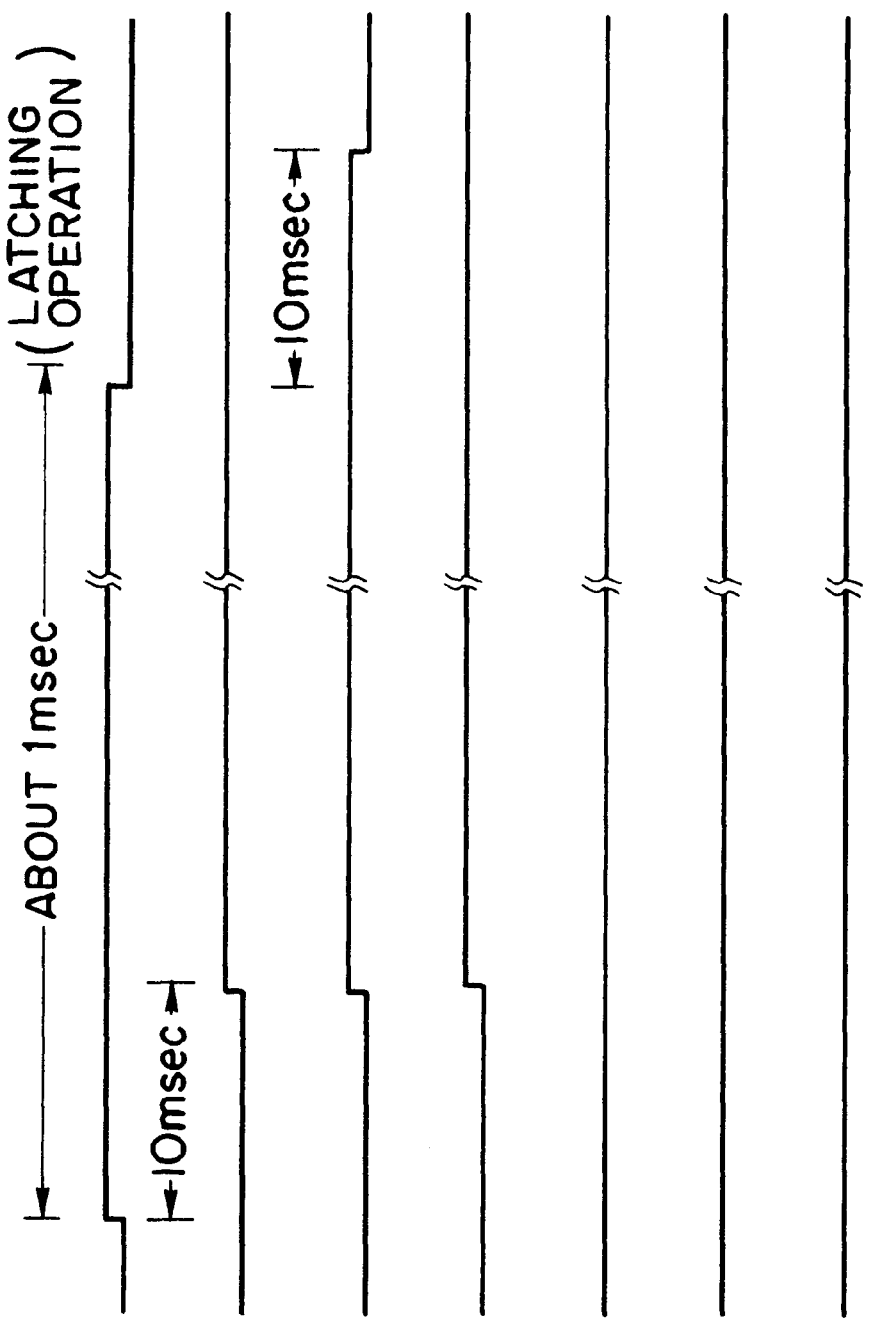
FIG. 21 is a timing chart showing a power source start-up sequence in independent operation of the BJ docking unit in the electronic device according to the embodiment of the present invention.

Latching operation must be performed to lock the docking lever, as described above. For this reason, as shown in FIG. 21, the DOCKON signal is enabled to supply only "VCC5A" as DC motor driving power to perform latching operation, and the printer system power source (PVCC5A) for replacement of the print head and ink tank of the μBJ printer described above is started up. After the latching operation, the power source is turned off to inhibit supply of only the power source (VCC5A) that is not required to operate the BJ docking unit 9 alone.

When the BJ docking unit 9 is to operate alone, the purpose of its operation is limited to replacement of the print head and ink tank of the μBJ printer. In addition, the BJ docking unit 9 cannot operate in synchronism with control operation of the core unit 2, e.g., a shift to low power consumption. For these reasons, the H8 910 turns off the power source when no command is issued to the μPB printer within 15 min after the sleep (Sleep) mode is set.

Power-off operation to be performed when no instruction is received within 15 min while the BJ docking unit 9 is operating alone will be described with reference to the flow chart of FIG. 22.

In step S2101, a timer is set to 0. In step S2102, it is checked whether the CAPACK signal is received. If YES in step S2102, the counting operation of the timer is started. In step S2104, it is checked whether the count value of the timer is 15 min or more. If NO in step S2104, the flow returns to step S2102 to check whether the CAPACK signal is received.

If YES in step S2104, the power source is turned off in step S2105. This processing is then terminated.

If it is determined in step S2102 that the CAPACK signal is not received, this processing is terminated without performing any processing.

Figure 22:
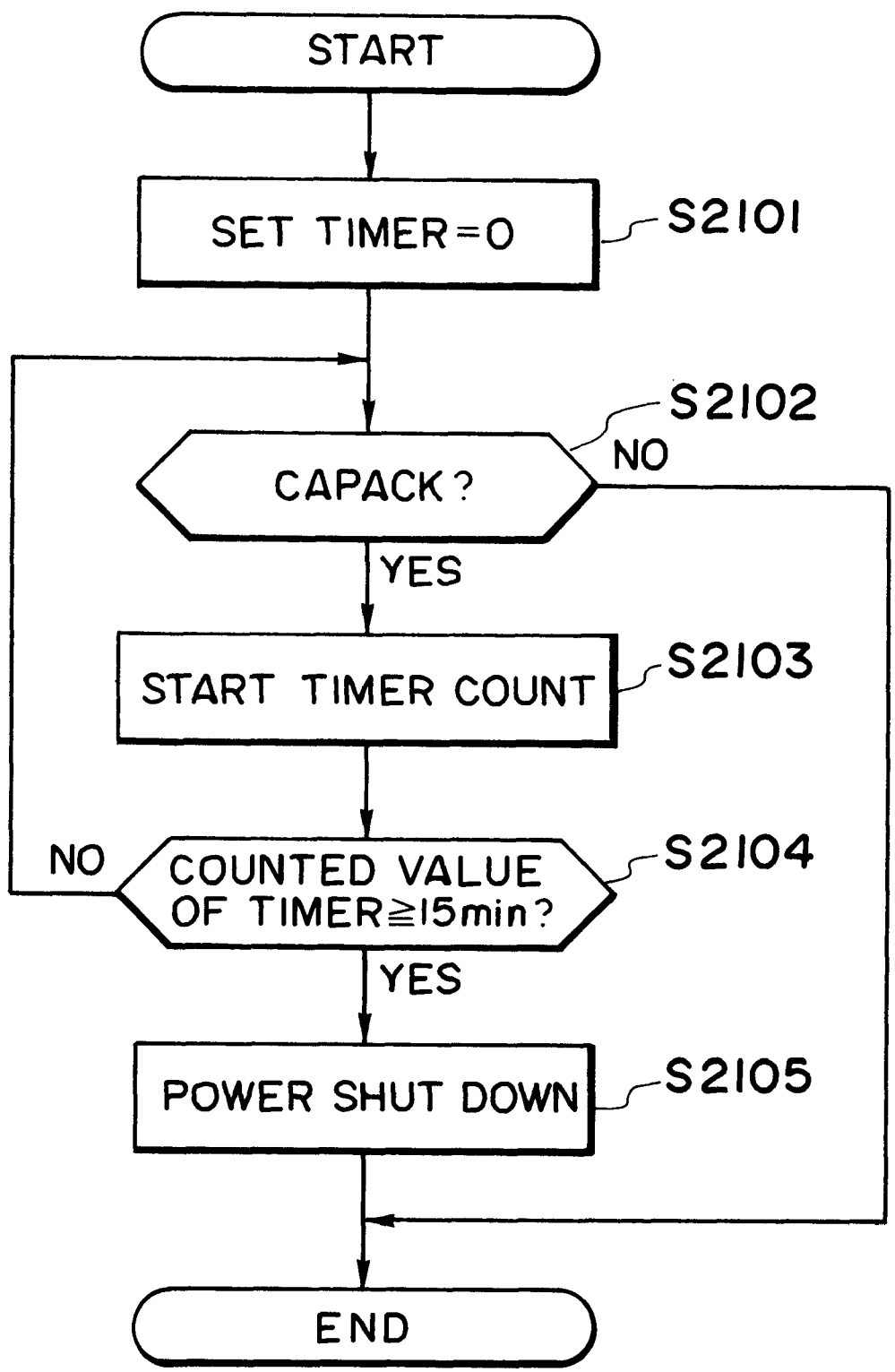
FIG. 22 is a flow chart showing a sequence in which the power source is turned off when the BJ docking unit operates alone and no command is received for 15 min in the electronic device according to the embodiment of the present invention.
Figure 23:
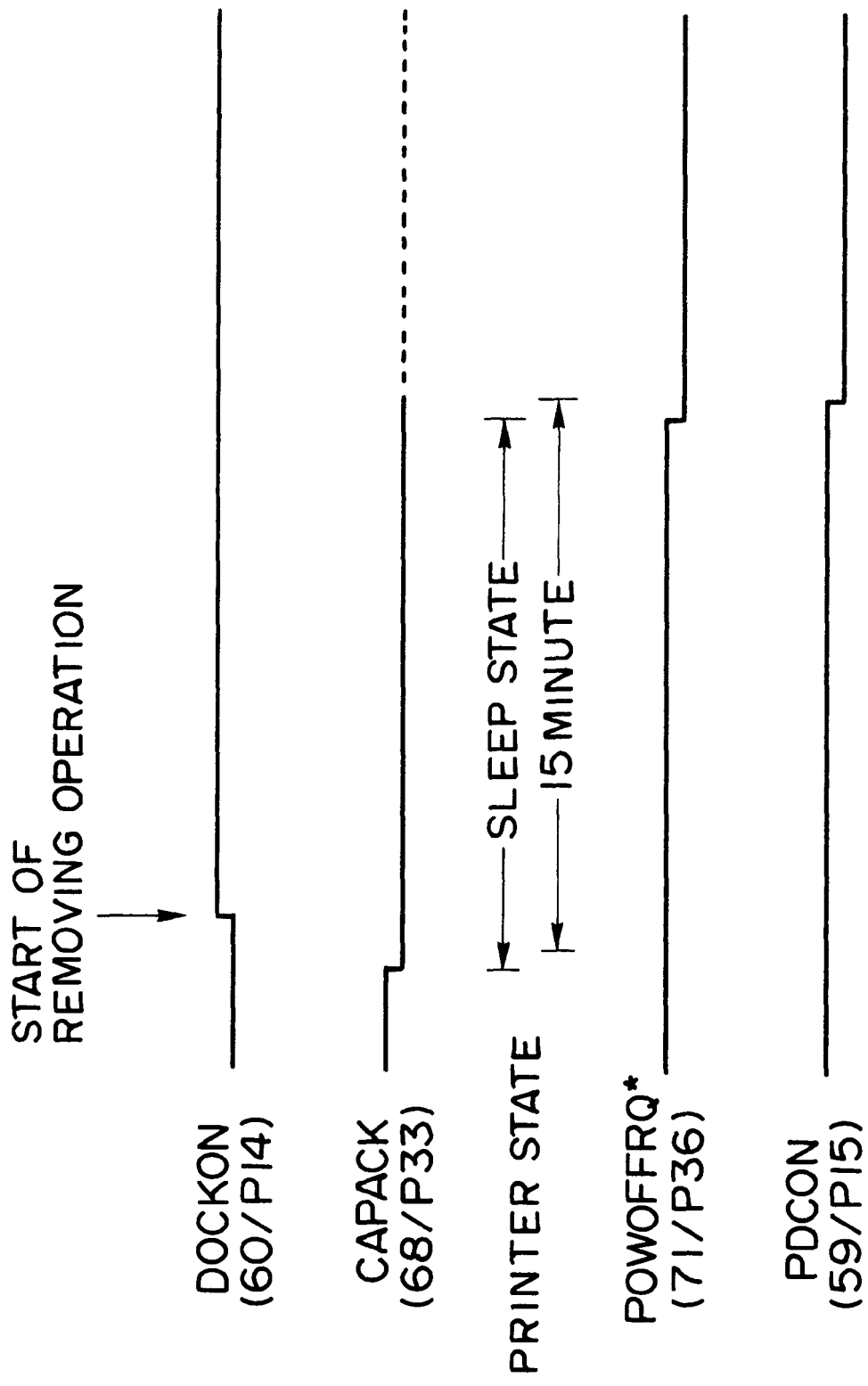
FIG. 23 is a timing chart showing the timing of turning off the power source when the BJ docking unit operates alone and no command is received for 15 min in the electronic device according to the embodiment of the present invention.

FIG. 23 is a timing chart showing the timing of each signal in the processing shown in the flow chart of FIG. 22.

Figure 24:
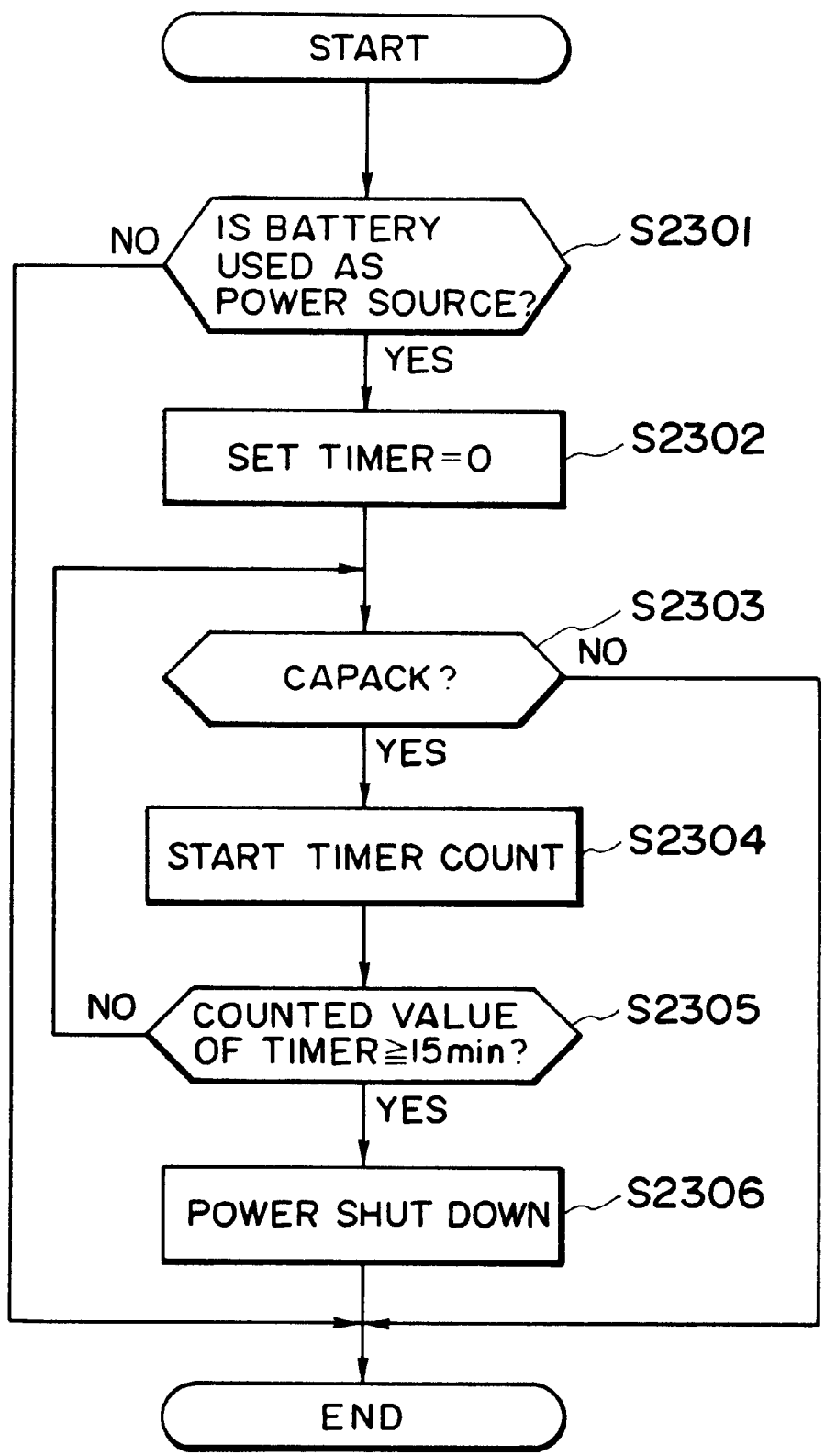
FIG. 24 is a flow chart showing a sequence different from that in FIG. 22, in which the power source is turned off when the BJ docking unit operates alone and no command is received for 15 min in the electronic device according to the embodiment of the present invention.

Power-off operation to be performed when no instruction is received within 15 min while the BJ docking unit 9 is operating alone on a battery will be described with reference to the flow chart of FIG. 24.

First of all, it is checked in step S2301 whether a battery is used as a power source. If NO in step S2301, this sequence is terminated without performing any processing. If YES in step S2301, the timer is set to 0 in step S2302. In step S2303, it is checked whether the CAPACK signal is received. If YES in step S2303, the counting operation of the timer is started in step S2304. In step S2305, it is checked whether the count value of the timer is 15 min or more. If NO in step S2305, the flow returns to step S2303 to check whether the CAPACK signal is received.

If it is determined in step S2305 that the count value of the timer is 15 min or more, the power source is turned off in S2306. Thereafter, this sequence is terminated.

If it is determined in step S2303 that the CAPACK signal is not received, this sequence is terminated without performing any processing.

FIG. 25 shows a normal power-off sequence in the system obtained by docking the core unit 2 and the BJ docking unit 9 to each other. FIG. 26 shows a normal power-off sequence when the BJ docking unit 9 operates alone.

Assume that in the above arrangement, "Printer off Request" based on the low battery threshold is detected while driving operation is performed using the battery pack 7. In this case, if the H8 910 of the BJ docking unit 9 determines on the basis of docking information associated with the core unit 2 that the BJ docking unit 9 operates alone, the H8 910 issues the POWOFFRQ* signal to the μBJ printer. After the CAPACK signal is received from the μBJ printer, the power shut down sequence shown in FIG. 26 is started.

Figure 27:
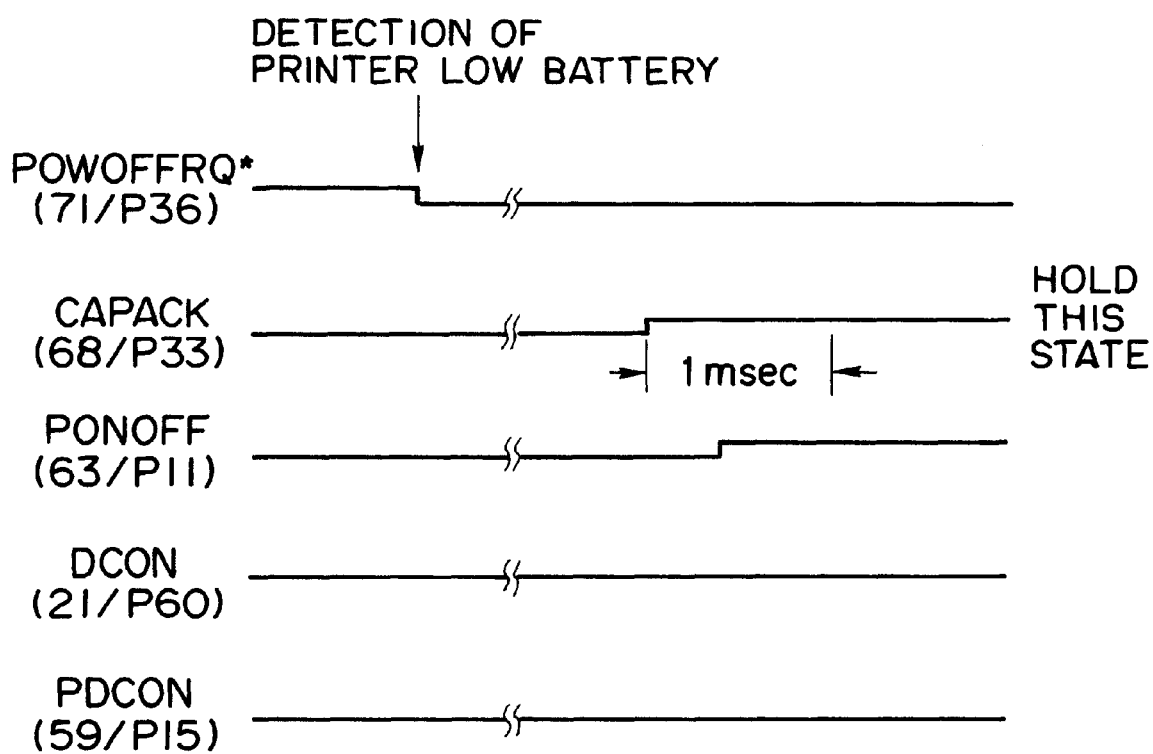
FIG. 27 is a timing chart showing the timing of printer low battery detection when the system is in a docking state in the electronic device according the embodiment of the present invention.

In the system obtained by docking the core unit 2 and the BJ docking unit 9 to each other, when "printer low battery" is detected, the POWOFFRQ* signal is issued to the μBJ printer, as shown in the timing chart of FIG. 27. After the CAPACK signal is received from the μBJ printer, the PONOFF* signal is set at high (High) level to turn off the μ BJ printer.

Figure 28:
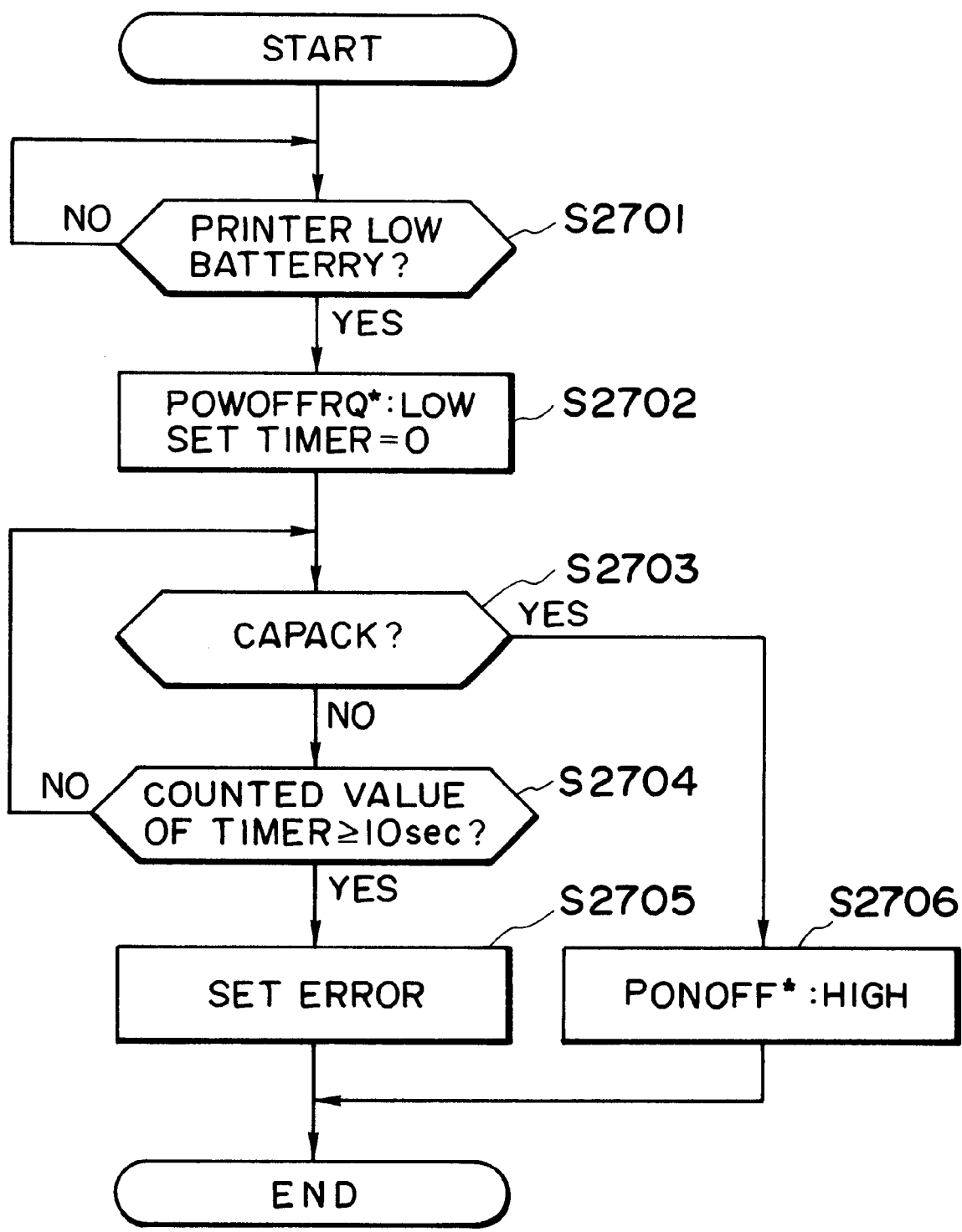
FIG. 28 is a flow chart showing a sequence of printer low battery operation to be performed when the system is in a docking state in the electronic device according to the embodiment of the present invention.

"Printer low battery" operation of the system configuration in the docking state will be described next with reference to the flow chart of FIG. 28.

First of all, it is checked in step S2701 whether "printer low battery" is detected. If YES in step S2701, the POWOFFRQ* signal is issued to the μBJ printer, and the timer is set to 0.

In step S2703, it is checked whether the CAPACK signal is received from the μBJ printer. If NO in step S2703, it is checked in step S2704 whether the count value of the timer is 10 sec or more. If NO in step S2704, the flow returns to step S2703 to check whether the CAPACK signal is received from the μBJ printer. If YES in step S2704, "Error" is set in step S2705. Then, this sequence is terminated.

If it is determined in step S2703 that the CAPACK signal is received from the μBJ printer, the PONOFF* signal is set at High level in step S2706 to turn off the μBJ printer. This sequence is then terminated.

In this state, the μBJ printer is set in the low-power-consumption mode, whereas the system other than the μBJ printer is kept operative.

The system operation after this state is performed as follows. It is checked whether the battery residual capacity has reached a value in the low battery threshold table determined depending on whether "Auto Suspend to Disk" set in the BIOS is on/off (the table in FIG. 13 when it is on; the table in FIG. 12 when it is off). When the battery residual capacity has reached this level, the power shut down sequence in FIG. 25 is started after predetermined processing.

Figure 29:
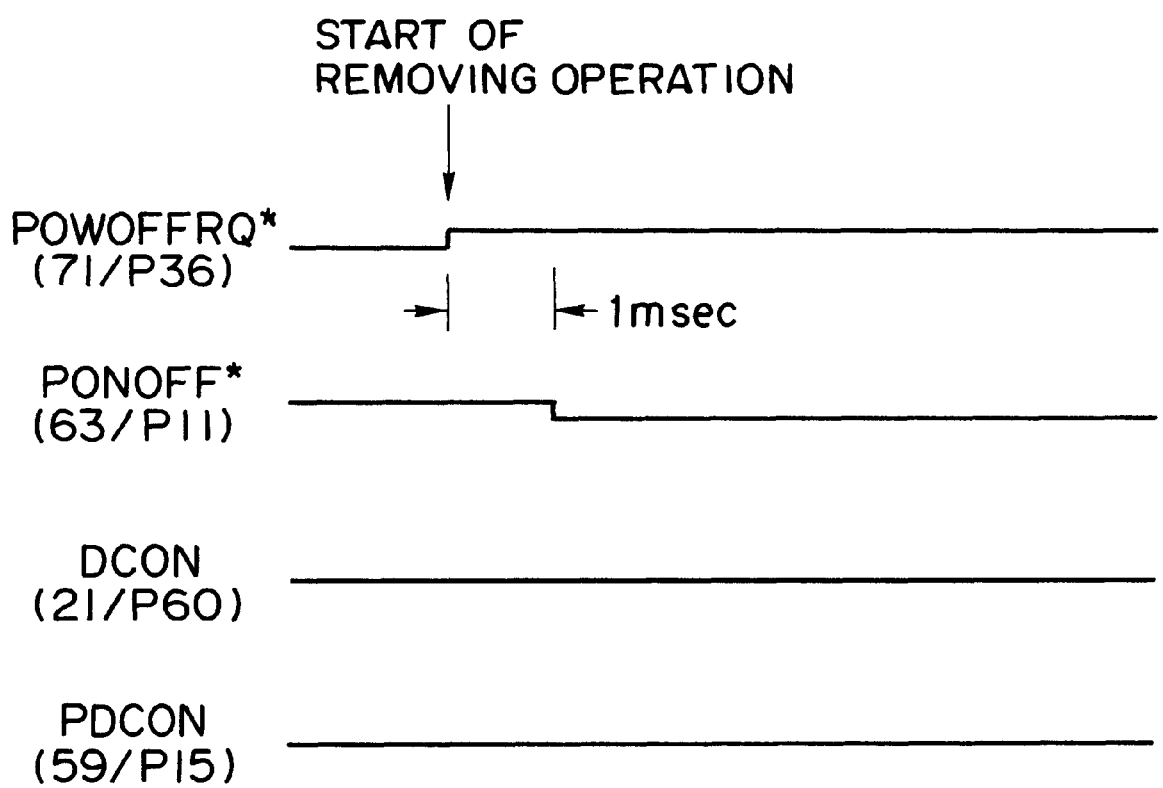
FIG. 29 is a timing chart showing the timing of printer low battery removing operation in the electronic device according to the embodiment of the present invention.

If an AC adaptor is inserted or a battery pack having a residual capacity is inserted in another slot before a low battery threshold based on "Auto Suspend to Disk" is detected, the μBJ printer is removed from the suspended state in accordance with the sequence in the timing chart of FIG. 29.

Figure 30:
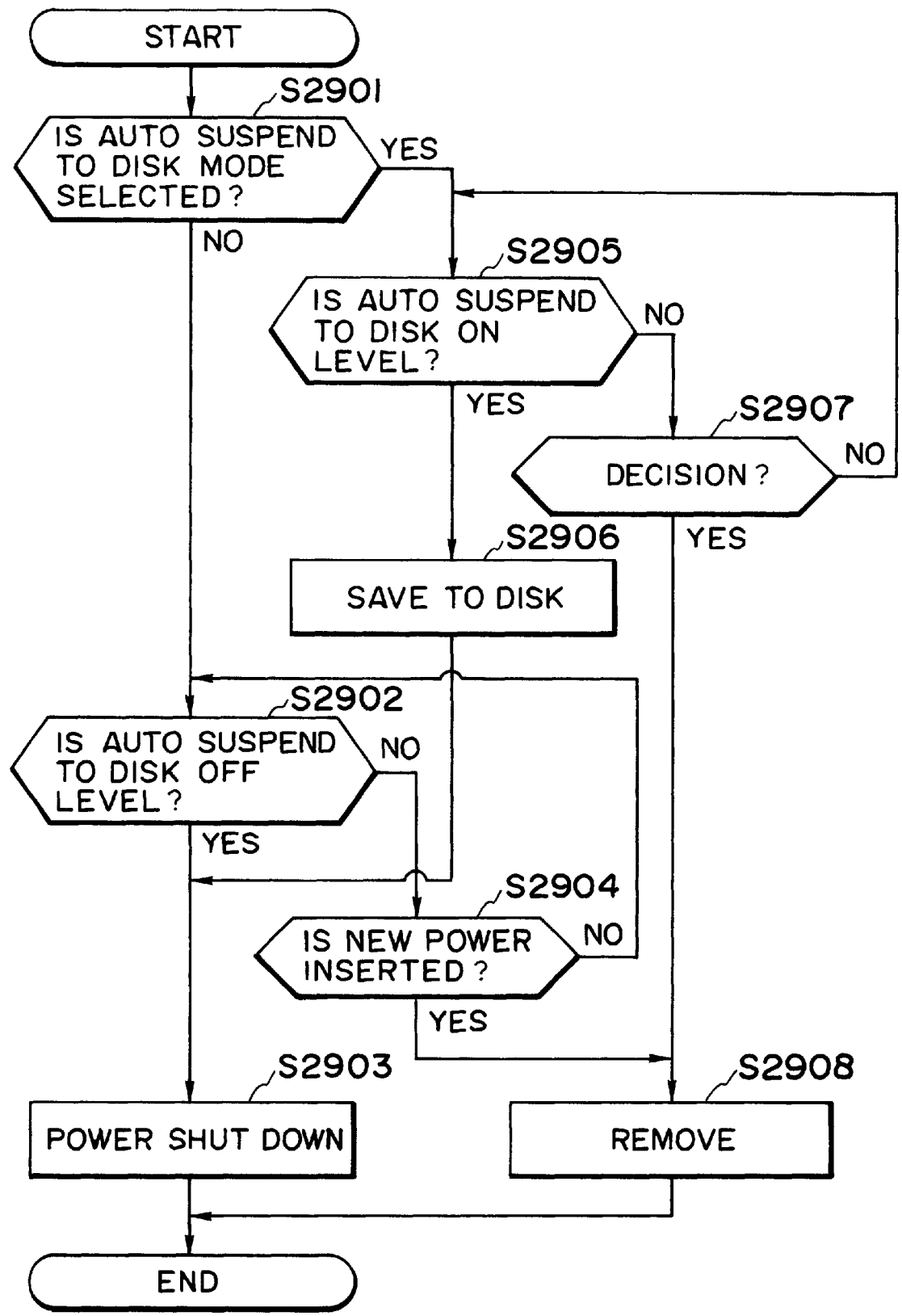
FIG. 30 is a flow chart showing a sequence of printer low battery operation to be performed when the system is in a docking state in the electronic device according to the embodiment of the present invention.

The system operation after the above state will be described with reference to the flow chart of FIG. 30.

In step S2901, it is checked whether the "Auto Suspend to Disk" mode is selected. If NO in step S2901, it is checked in step S2902 whether the "Auto Suspend to Disk" OFF level is set. If YES in step S2902, the flow shifts to the "power shut down" sequence in FIG. 26 in step S2903. This sequence is then terminated.

If it is determined in step S2901 that the "Auto Suspend to Disk" mode is selected, it is checked in step S2905 whether the "Auto Suspend to Disk" ON level is set. If YES in step S2905, the current state is saved in the disk in step S2906. After that, the flow shifts the "power shut down" sequence in FIG. 26 in step S2303.

If it is determined in step S2905 that the "Auto Suspend to Disk" ON level is not set, it is checked in step S2907 whether the battery residual capacity has reached a value in the low battery threshold table. If NO in step S2907, the flow returns to step S2905 to check whether the "Auto Suspend to Disk" ON level is set.

If it is determined in step S2907 that the battery residual capacity has reached a value in the low battery threshold table, the μBJ printer is removed from the suspended state in accordance with the sequence in the timing chart of FIG. 29 in step S2908. After this process, this sequence is terminated.

If it is determined in step S2902 that the "Auto Suspend to Disk" OFF level is not set, it is checked in step S2904 whether a new power source is inserted, e.g., an AC adaptor is inserted or another battery pack having a residual capacity is inserted in another slot. If NO in step S2904, the flow returns to step S2902 to check whether "Auto Suspend to Disk" OFF level is set. If YES in step S2904, the μBJ printer is removed from the suspended state in accordance with the sequence in the timing chart of FIG. 29 in step S2908. Again, this sequence is terminated.

Figure 31:
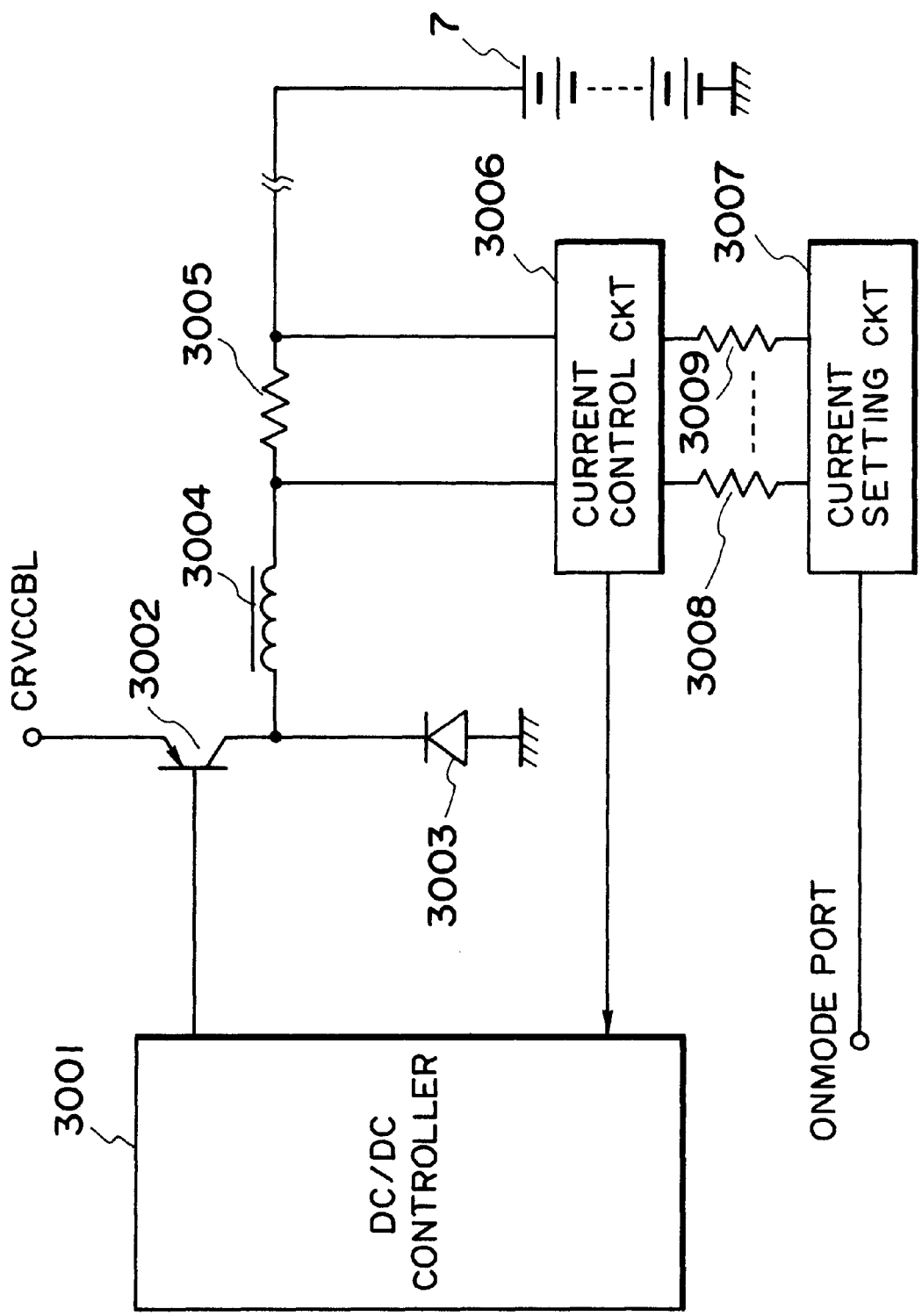
FIG. 31 is a block diagram showing the internal arrangement of a charge control circuit in the electronic device according to the embodiment of the present invention.

FIG. 31 is a block diagram showing the internal arrangement of a charge control circuit. Referring to FIG. 31, in controlling a power source for charging the battery pack 7, a DC/DC controller IC 3001 controls a transistor 3002 to generate a predetermined charge voltage by a diode 3003 and a coil 3004. Meanwhile, a current detection resistor 3005 detects the charge current, and a current control circuit 3006 receives it. A current setting circuit 3007 selects a current setting resistor 3008 or a current setting resistor 3009 in accordance with information from the ONMODE port. The current control circuit 3006 returns a current control feedback signal based on the above resistance to the DC/DC controller IC 3001, thereby controlling the charge current to a predetermined charge current limit.

While the system power source is off, power is supplied to only the MPU, and the power source used to charge through an AC adaptor can be used to its almost full capacity. In the present invention, this OFF-mode charge current limit is set to 1.9 A. In this case, when the ONMODE port in FIG. 31 is disabled, the current setting resistor 3008 is selected by the current setting circuit 3007, and the current control circuit 3006 controls the charge current to the current limit of 1.9 A.

While the system power source is on, since power is used by the system, limitations are imposed on the power source used to charge. In the present invention, the lower ON-mode charge current limit is set to 0.5 A. In this case, when the ONMODE port in FIG. 31 is enabled, the current setting resistor 3009 is selected by the current setting circuit 3007, and the current control circuit 3006 controls the charge current to the current limit of 0.5 A.

FIG. 15 will be further described below. The data shown in FIG. 15 are the measured values of charge characteristics representing the charge current and voltage of one battery pack used in the present invention. FIG. 15 shows the characteristics obtained when the battery pack 7 is charged by OFF-mode charging operation, in which charging is performed while the system power source is off, after the battery cells in the pack are completely discharged. "1ch" (the curve at the upper position) in FIG. 15 represents the voltage value which becomes 16.1 V immediately after the start of measurement on the right side of the drawing, and gradually increases with time. "3ch" (the curve at the lower position) in FIG. 15 represents the charge current value which is 1.9 A at the start of measurement, and becomes 1.5 A about three min after measurement. Subsequently, this value gradually decreases and becomes nearly 0.05 A immediately before the end of measurement.

In ON-mode charging, the charge current is limited to 0.5 A at a point A in FIG. 15, and hence the charging time is prolonged accordingly. Obviously, the charging time can be shortened by increasing the charge current limit.

According to the present invention, therefore, the charge current is set by checking the current used in the system and the remaining capacity of the AC adaptor. In the system, the HDD, the CD-ROM, the built-in printer, and the like consume large currents. An approximate maximum current consumption is known in advance. The overall current consumption can therefore be determined before the system is driven. When only the HDD is driven, since the HDD is located on the core unit 2 side, i.e., the main unit side, and is frequently used, the current consumption of the system, including the current consumed by the HDD, is set as a default value.

In this case, the ON-mode charge current is set to 1.9 A because of the remaining capacity of the AC adaptor. This applies to OFF-mode charging. Since the CD-ROM and the built-in printer are located on the BJ docking unit 9 side, i.e., the docking station unit side, and are used less frequently than the HDD, ON-mode charging with 1.9 A can be performed almost always in normal operation. When the CD-ROM and the built-in printer are driven, the charge current limit is decreased step by step in accordance with the current consumed by these components. The minimum charge current limit in ON-mode charging is 0.5 A.

Figure 32:
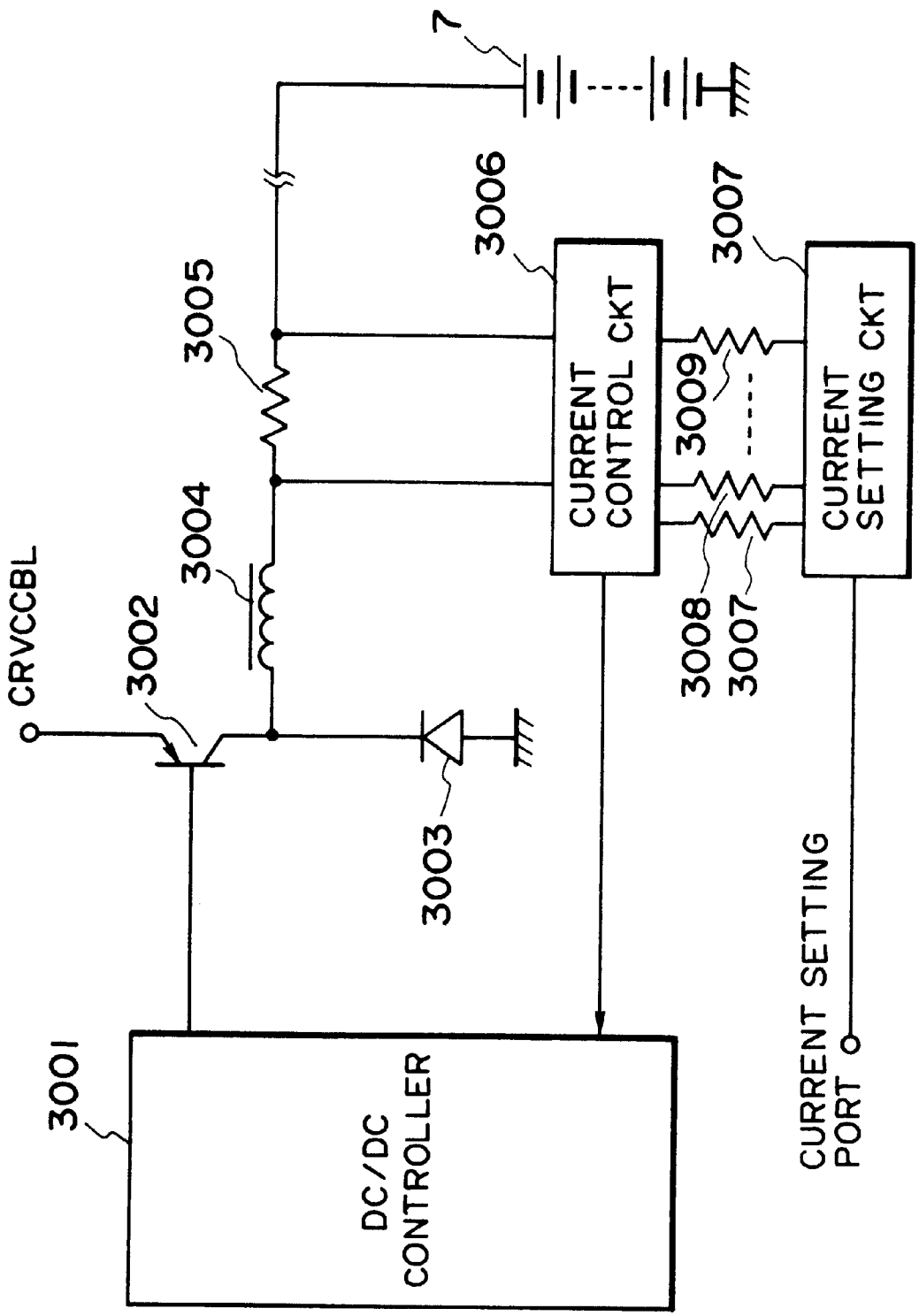
FIG. 32 is a block diagram showing the internal arrangement of a charge control circuit different from the one shown in FIG. 31 in the electronic device according to the embodiment of the present invention.

FIG. 32 is a block diagram showing the internal arrangement of a charge control circuit. The same reference numerals in FIG. 32 denote the same parts as in FIG. 31.

The circuit in FIG. 32 differs from the circuit in FIG. 31 in that a current setting port is used in place of the ONMODE port, a current setting resistor 3009 changes the charge current limit in n steps, and n current setting resistors 3008 to 3008+n are arranged to set n charge currents.

Assume that charging is to be started while the built-in printer is driven. In this case, if the charge current limit is set to 0.7 A, and Rx represents the corresponding current setting resistance, the system sends the information to a current setting circuit 3007 through the current setting port. As a result, the current setting circuit 3007 selects the current setting resistance Rx, and a current control circuit 3006 sets the charge current limit to 0.7 A. With this charge current, charging for the battery pack 7 is started.

Figure 33:
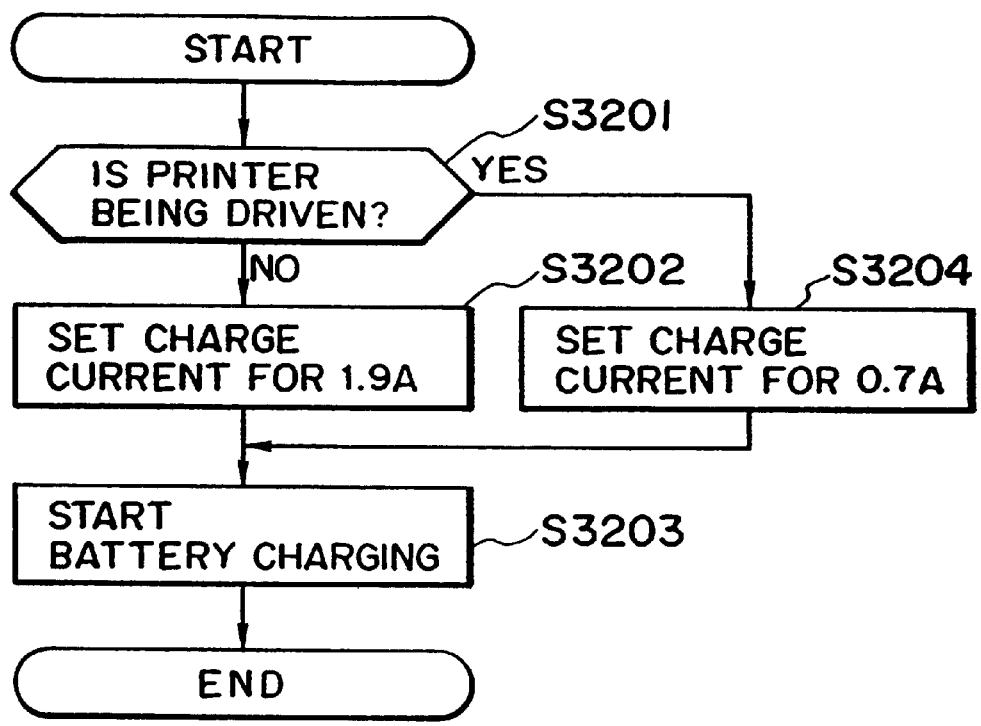
FIG. 33 is a flow chart showing a sequence of charge control in the electronic device according to the embodiment of the present invention.

Charge control operation will be described next with reference to the flow chart of FIG. 33.

First of all, it is checked in step S3201 whether the printer is being driven. If NO in step S3201, the charge current is set to 1.9 A in step S3202. In step S3203, charging of the battery pack 7 is started, and this sequence is terminated. If YES in step S3201, the charge current is set to 0.7 A in step S3204. In step S3203, charging of the battery pack 7 is started, and this sequence is terminated.

If the built-in printer stops during charging, the charge current limit can be increased to 0.7 A or more. While the CD-ROM is driven, a predetermined charge current limit is set, and charging is started in the same manner as described above. In addition, while other driving systems are driven in combination, the charge current limit is set to a low value, and charging is started in the same manner. If the system includes a changing means for changing the settings to give priority to the charge mode over other driving modes in the system, the charging time can be shortened by imposing limitations on driving modes other than the charge mode during charging. In this case, an actual charge current may be detected, and limitations imposed on the respective driving modes can be canceled in accordance with a decrease in charge current.

A charging method to be used when the battery packs 7 are mounted in both the core unit 2 and the BJ docking unit 9 will be described next.

According to the charge characteristic curve in OFF-mode charging, which has been additionally described above in reference to FIG. 15, since, for example, the charge current becomes 0.5 A about two hrs after the start of charging, charging of the second battery pack 7 is started two hrs after the start of charging of the first battery pack 7.

The charge current may be monitored so that charging of the second battery pack 7 is started when the charge current decreases to 0.5 A, instead of being started after a lapse of two hrs. In this case, since consumed power exerted on the AC adaptor is about 50 W, and the AC adaptor used in this embodiment has a sufficiently large capacity of 54 W, the charge current limit for the first battery pack can be slightly increased from 0.5 A without posing any problem.

Figure 34:
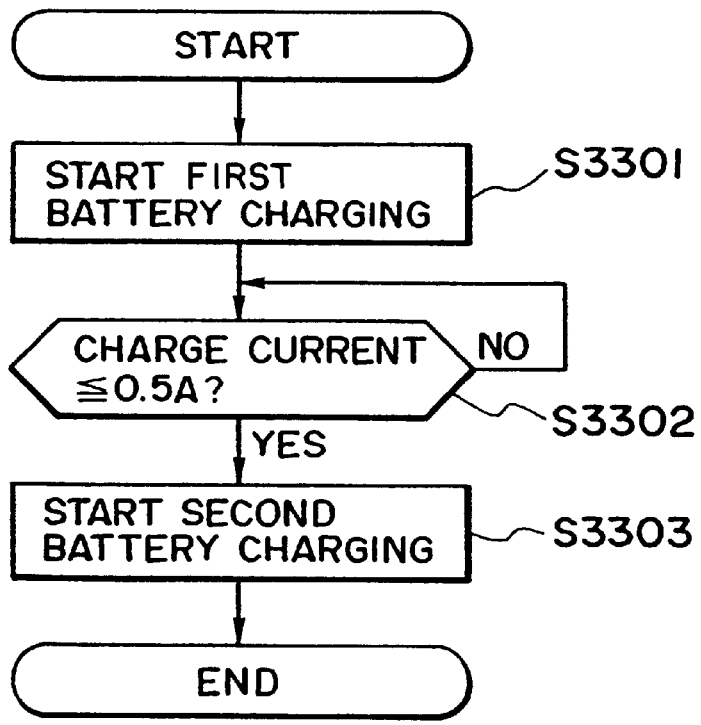
FIG. 34 is a flow chart showing a sequence of charge control different from that shown in FIG. 33 in the electronic device according to the embodiment of the present invention.

Charging operation to be performed when the battery packs 7 are mounted in both the core unit 2 and the BJ docking unit 9 will be described below with reference to the flow chart of FIG. 34.

First of all, charging of the first battery pack 7 is started in step S3301. It is checked in step S3302 whether the charge current is 0.5 A or less (charge current$\leqq$0.5 A). If it is determined that the charge current is larger than 0.5 A (charge current>0.5 A), it is repeatedly checked whether the charge current is 0.5 A or less (charge current$\leqq$0.5 A). If YES in step S3302, charging of the second battery pack 7 is started in step S3303. Then, this sequence is terminated.

The charge control circuit shown in FIG. 32 is used as follows. If, for example, the charge current limit is set to 0.7 A, and Rx represents the corresponding current setting resistance, the information is sent to the current setting circuit 3007 through the current setting port, and the current setting circuit 3007 selects the current setting resistor Rx, while the current control circuit 3006 sets the charge current limit to 0.7 A.

Assume that OFF-mode charging of the first battery pack 7 is to be started with a charge current limit of 1.9 A, and charging of the second battery pack 7 is to be started at the same time. In this case, the charge current limit must be set to 0.7 A owing to the power capacity of the AC adaptor. This value is set by the current setting circuit in the charge control unit on the BJ docking unit 9 side.

In the above simultaneous OFF-mode charging, the charge current for the first battery pack 7 abruptly decreases about three min after the start of charging. Therefore, the charge current limit (0.7 A) for the second battery pack 7 can be increased in accordance with this decrease in current value.

Figure 35:
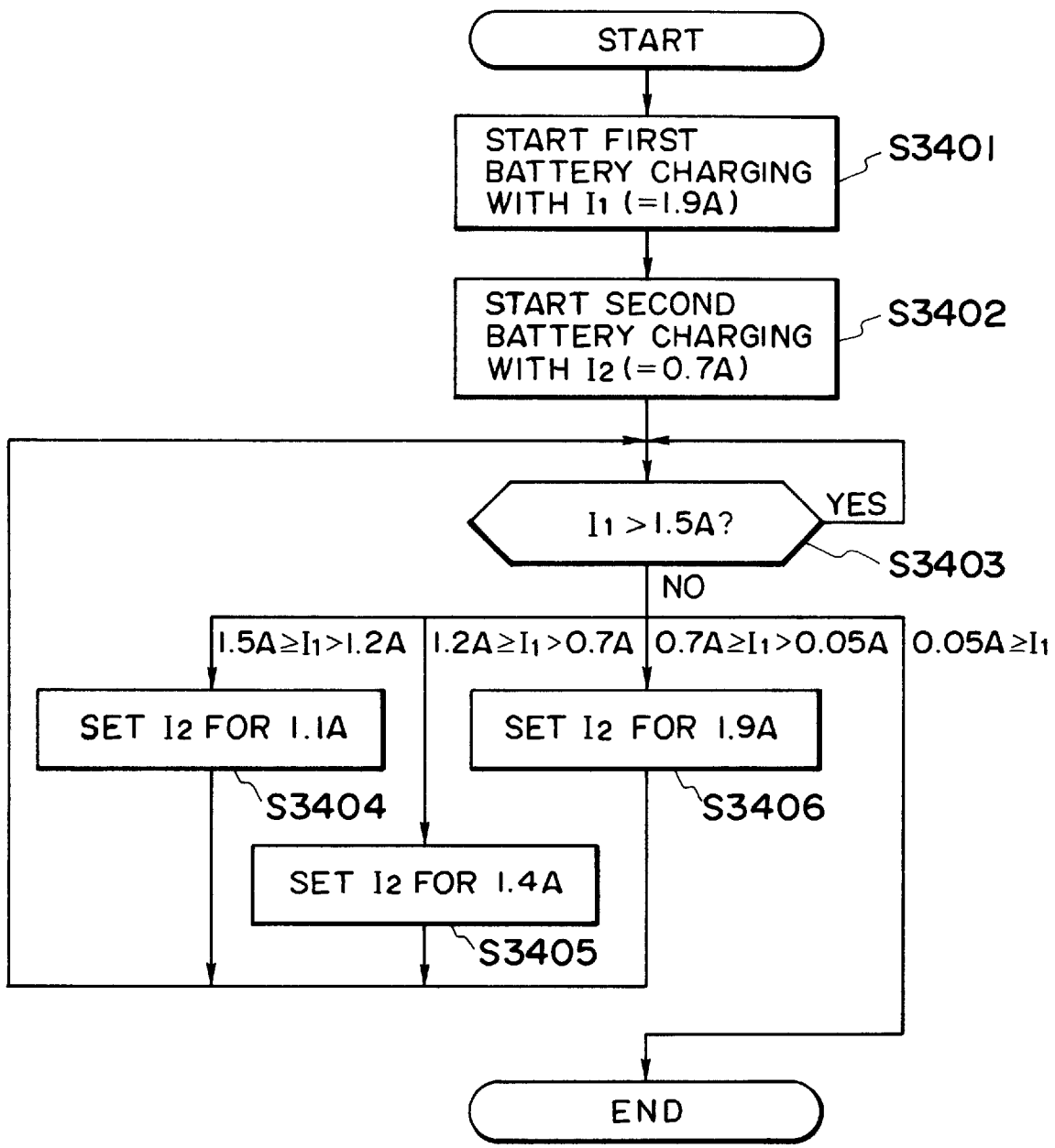
FIG. 35 is a flow chart showing a sequence of charge control different from that shown in FIGS. 33 and 34 in the electronic device according to the embodiment of the present invention.

Charging operation different from that shown in the flow chart of FIG. 34, which is to be performed when the battery packs 7 are mounted in both the core unit 2 and the BJ docking unit 9, will be described next with reference to the flow chart of FIG. 35.

First of all, charging of the first battery pack 7 is started with a charge current (I1) of 1.9 A in step S3401. In step S3402, charging of the second battery pack 7 is started with a charge current (I2) of 0.7 A. In step S3403, the value of the charge current (I1) for the first battery pack 7 is checked.

If charge current I1>1.5 A, decision processing is repeatedly performed for the value of the charge current (I1) for the first battery pack 7. If 1.5 A$\geqq$charge current I1>1.2 A, the value of the charge current (I2) for the second battery pack 7 is set to 1.1 A in step S3404. If 1.2 A$\geqq$charge current I1>0.7 A, the value of the charge current (I2) for the second battery pack 7 is set to 1.4 A in step S3405. If 0.7 A$\geqq$charge current I1>0.05 A, the value of the charge current (I2) for the second battery pack 7 is set to 1.9 A in step S3406. If 0.05 A$\geqq$charge current I1, this sequence is terminated.

After completion of the processing in step S3404, S3405, or S3406, the flow returns to step S3403 to check the value of the charge current (I1) for the first battery pack 7.

The above embodiment has exemplified the case of two battery packs. However, similar control can be performed when three or more battery packs are used.

In the above embodiment, the μBJ printer is used. Obviously, however, the present invention can be applied to a case in which a printer of a different scheme is used.

As has been described in detail above, according to the present invention, the utilization efficiency of the system using a battery as a driving power source can be improved.

According to the present invention, fine battery control can be performed with high power efficiency.

According to the present invention, when the docking unit is to operate alone, high circuit stability can be maintained, and wasteful consumption of power can be prevented.

According to the present invention, the utilization efficiency of the docking unit can be improved when it operates alone.

According to the present invention, even while the system power source is on, the charging time can be shortened by making full use of the power supplied through the AC adaptor so as to partly use it for charging. Therefore, limitations imposed in terms of the charging time of a secondary battery for portability can be reduced, resulting in an improvement in operability.

According to the present invention, charging is performed by making full use of the power supplied through the AC adaptor, and the charging time of a plurality of battery packs can be shortened. Limitations imposed in terms of the charging time of a second battery for portability can be reduced, resulting in an improved operability.

What is claimed is:

1. An electronic device which can be driven by a battery and has a docking system configuration in which an extension portion can be detachably mounted by using a system bus as a bridge, said system comprising a plurality of extension portions, wherein a power source control IC of each of a master portion and said extension portions connected in said docking system includes setting means for selecting and setting a low battery detection threshold and a charge current limit which are unique to the current system, and wherein a system ID (identifier) is used to discriminate said extension portion.

2. An electronic device which can be driven by a battery and has a docking system configuration in which a docking unit mainly serving as an extension can be attached/detached to/from a master unit by using a system bus as a bridge, said docking unit incorporating a printer and being capable of operating alone upon start-up of a power source even while being detached from said master unit, and each of said docking unit and said master unit comprising docking detection means for detecting whether said units are docked to each other, operation state detection means for detecting an operation state of said printer, and control means for, when said docking unit operates as a docking system together with said master unit, performing power source control through said master unit, and for, when said docking unit operates while being detached from said master unit, controlling all power sources through a power control unit in said docking unit, and turning off the power source if no operation/print command is received after a lapse of a predetermined period of time.

3. A device according to claim 2, wherein said electronic device is a portable computer.

4. An electronic device which can be driven by a battery and has a master unit and a docking unit detachably attached to the master unit, comprising;

a function extension bus for connecting the docking unit to the master unit;

determining means for determining whether or not the docking unit is connected to the master unit;

control means for controlling closing of said function extension bus if said determining means determines that the docking unit is not connected to the master unit, and opening of said function extension bus if said determining means determines that the docking unit is connected to the master unit; and power source management means for performing power source management on the basis of a result of said determining means, wherein if the docking unit includes a printer, said control means initializes the printer before opening said function extension bus by said control means.

5. An electronic device according to claim 4, wherein said device further comprises lock means for locking-on a connection state between the docking unit and the master unit if said determining means determines that the docking unit is connected to the master unit, said lock means opening said function extension bus by said control means after locking-on by said lock means.

6. An electronic device which can be driven by a battery and has a master unit and a docking unit detachably attached to the master unit, comprising;

a first power source control portion for performing power source control within the master unit;

a second power source control portion for performing power source control within the docking unit; and determining means for determining whether or not the docking unit is connected to the master unit;

lock means for locking-on a connection member for connecting the docketing unit and said master unit irrespective of whether or not the docking unit is connected to said master unit, wherein said second power source control portion performs independently power source control within the docking unit if said determining means determines that the docking unit is not connected to the master unit, and said second power source control portion performs power source control under the control of said first power source control portion if said determining means determines that the docking unit is connected to the master unit.

7. An electronic device according to claim 6, wherein the docking unit includes a printer.

8. An electronic device according to claim 6, wherein said device further comprises control means for controlling closing of a function extension bus connecting the docking unit to the master unit if said determining means determines that the docking unit is not connected to the master unit, and opening of the function extension bus if said determining means determines that the docking unit is connected to the master unit.

* * * * *